(12) United States Patent
Mosko

(10) Patent No.: US 9,390,289 B2
(45) Date of Patent: Jul. 12, 2016

(54) SECURE COLLECTION SYNCHRONIZATION USING MATCHED NETWORK NAMES

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 103 days.

(21) Appl. No.: 14/247,165

(22) Filed: Apr. 7, 2014

(65) Prior Publication Data

US 2015/0286844 A1    Oct. 8, 2015

(51) Int. Cl.
| | |
|---|---|
| *H04L 29/06* | (2006.01) |
| *G06F 21/64* | (2013.01) |
| *G06F 17/30* | (2006.01) |
| *H04L 29/08* | (2006.01) |

(52) U.S. Cl.
CPC ............ *G06F 21/64* (2013.01); *G06F 17/3033* (2013.01); *H04L 65/1069* (2013.01); *H04L 65/4084* (2013.01); *H04L 67/327* (2013.01); *H04L 63/126* (2013.01)

(58) Field of Classification Search
CPC ..................... H04L 2463/101; H04L 2209/60; H04L 2209/603
USPC .......................................................... 713/167
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

(Continued)

*Primary Examiner* — Jason K Gee
(74) *Attorney, Agent, or Firm* — Shun Yao; Park, Vaughan, Fleming & Dowler LLP

(57) ABSTRACT

One embodiment provides a system that facilitates facilitate secure synchronization of manifests using exact network names. During operation, the system generates an interest of advertisement comprising a name of a content object of the system. This name represents a collection of objects of the system and includes a first hash that is based on a key of the system. The first hash corresponds to a respective content object hash of one or more segments of a manifest representing the collection of objects. The system also determines a request for the content object based on the name in an interest of data from a remote node.

20 Claims, 19 Drawing Sheets

(56) References Cited

U.S. PATENT DOCUMENTS

| | | | |
|---|---|---|---|
| 6,052,683 | A | 4/2000 | Irwin |
| 6,091,724 | A | 7/2000 | Chandra |
| 6,173,364 | B1 | 1/2001 | Zenchelsky |
| 6,226,618 | B1 | 5/2001 | Downs |
| 6,233,646 | B1 | 5/2001 | Hahm |
| 6,332,158 | B1 | 12/2001 | Risley |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,769,066 | B1 | 7/2004 | Botros |
| 6,772,333 | B1 | 8/2004 | Brendel |
| 6,862,280 | B1 | 3/2005 | Bertagna |
| 6,901,452 | B1 | 5/2005 | Bertagna |
| 6,917,985 | B2 | 7/2005 | Madruga |
| 6,968,393 | B1 | 11/2005 | Chen |
| 6,981,029 | B1 | 12/2005 | Menditto |
| 7,013,389 | B1 | 3/2006 | Srivastava |
| 7,031,308 | B2 | 4/2006 | Garcia-Luna-Aceves |
| 7,061,877 | B1 | 6/2006 | Gummalla |
| 7,206,860 | B2 | 4/2007 | Murakami |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,382,787 | B1 | 6/2008 | Barnes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,769,887 | B1 | 8/2010 | Bhattacharyya |
| 7,779,467 | B2 | 8/2010 | Choi |
| 7,801,177 | B2 | 9/2010 | Luss |
| 7,816,441 | B2 | 10/2010 | Elizalde |
| 7,831,733 | B2 | 11/2010 | Sultan |
| 7,908,337 | B2 | 3/2011 | Garcia-Luna-Aceves |
| 7,924,837 | B1 | 4/2011 | Shabtay |
| 7,953,885 | B1 | 5/2011 | Devireddy |
| 8,000,267 | B2 | 8/2011 | Solis |
| 8,010,691 | B2 | 8/2011 | Kollmansberger |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,312,064 | B1 | 11/2012 | Gauvin |
| 8,386,622 | B2 | 2/2013 | Jacobson |
| 8,467,297 | B2 | 6/2013 | Liu |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,688,619 | B1 | 4/2014 | Ezick |
| 8,699,350 | B1 | 4/2014 | Kumar |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,862,774 | B2 | 10/2014 | Vasseur |
| 8,903,756 | B2 | 12/2014 | Zhao |
| 8,937,865 | B1 | 1/2015 | Kumar |
| 9,071,498 | B2 | 6/2015 | Beser |
| 9,112,895 | B1 | 8/2015 | Lin |
| 2002/0010795 | A1 | 1/2002 | Brown |
| 2002/0048269 | A1 | 4/2002 | Hong |
| 2002/0054593 | A1 | 5/2002 | Morohashi |
| 2002/0077988 | A1 | 6/2002 | Sasaki |
| 2002/0078066 | A1 | 6/2002 | Robinson |
| 2002/0138551 | A1 | 9/2002 | Erickson |
| 2002/0176404 | A1 | 11/2002 | Girard |
| 2002/0188605 | A1* | 12/2002 | Adya ................ G06F 17/30094 |
| 2002/0199014 | A1 | 12/2002 | Yang |
| 2003/0046437 | A1 | 3/2003 | Eytchison |
| 2003/0048793 | A1 | 3/2003 | Pochon |
| 2003/0051100 | A1 | 3/2003 | Patel |
| 2003/0074472 | A1 | 4/2003 | Lucco |
| 2003/0097447 | A1 | 5/2003 | Johnston |
| 2003/0140257 | A1 | 7/2003 | Peterka |
| 2004/0024879 | A1 | 2/2004 | Dingman |
| 2004/0030602 | A1 | 2/2004 | Rosenquist |
| 2004/0073715 | A1 | 4/2004 | Folkes |
| 2004/0139230 | A1 | 7/2004 | Kim |
| 2004/0221047 | A1 | 11/2004 | Grover |
| 2004/0225627 | A1 | 11/2004 | Botros |
| 2004/0252683 | A1 | 12/2004 | Kennedy |
| 2005/0003832 | A1 | 1/2005 | Osafune |
| 2005/0028156 | A1 | 2/2005 | Hammond |
| 2005/0043060 | A1 | 2/2005 | Brandenberg |
| 2005/0050211 | A1 | 3/2005 | Kaul |
| 2005/0074001 | A1 | 4/2005 | Mattes |
| 2005/0149508 | A1 | 7/2005 | Deshpande |
| 2005/0159823 | A1 | 7/2005 | Hayes |
| 2005/0198351 | A1 | 9/2005 | Nog |
| 2005/0249196 | A1 | 11/2005 | Ansari |
| 2005/0259637 | A1 | 11/2005 | Chu |
| 2005/0262217 | A1 | 11/2005 | Nonaka |
| 2005/0289222 | A1 | 12/2005 | Sahim |
| 2006/0010249 | A1 | 1/2006 | Sabesan |
| 2006/0029102 | A1 | 2/2006 | Abe |
| 2006/0039379 | A1 | 2/2006 | Abe |
| 2006/0051055 | A1 | 3/2006 | Ohkawa |
| 2006/0072523 | A1 | 4/2006 | Richardson |
| 2006/0099973 | A1 | 5/2006 | Nair |
| 2006/0129514 | A1 | 6/2006 | Watanabe |
| 2006/0133343 | A1 | 6/2006 | Huang |
| 2006/0173831 | A1 | 8/2006 | Basso |
| 2006/0193295 | A1 | 8/2006 | White |
| 2006/0206445 | A1 | 9/2006 | Andreoli |
| 2006/0215684 | A1 | 9/2006 | Capone |
| 2006/0223504 | A1 | 10/2006 | Ishak |
| 2006/0256767 | A1 | 11/2006 | Suzuki |
| 2006/0268792 | A1 | 11/2006 | Belcea |
| 2007/0019619 | A1 | 1/2007 | Foster |
| 2007/0073888 | A1 | 3/2007 | Madhok |
| 2007/0094265 | A1 | 4/2007 | Korkus |
| 2007/0112880 | A1 | 5/2007 | Yang |
| 2007/0124412 | A1 | 5/2007 | Narayanaswami |
| 2007/0127457 | A1 | 6/2007 | Mirtorabi |
| 2007/0160062 | A1 | 7/2007 | Morishita |
| 2007/0162394 | A1 | 7/2007 | Zager |
| 2007/0189284 | A1 | 8/2007 | Kecskemeti |
| 2007/0195765 | A1 | 8/2007 | Heissenbuttel |
| 2007/0204011 | A1 | 8/2007 | Shaver |
| 2007/0209067 | A1 | 9/2007 | Fogel |
| 2007/0239892 | A1 | 10/2007 | Ott |
| 2007/0240207 | A1 | 10/2007 | Belakhdar |
| 2007/0245034 | A1 | 10/2007 | Retana |

(56) References Cited

U.S. PATENT DOCUMENTS

| | | |
|---|---|---|
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |

(56) References Cited

U.S. PATENT DOCUMENTS

| | | |
|---|---|---|
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1* | 5/2014 | Kim .................. H04L 67/1097 713/153 |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | | |
|---|---|---|---|
| EP | 0295727 | A2 | 12/1988 |
| EP | 0757065 | A2 | 7/1996 |
| EP | 1077422 | A2 | 2/2001 |
| EP | 1384729 | A1 | 1/2004 |
| EP | 2124415 | A2 | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |

OTHER PUBLICATIONS

B. Lynn$2E.
C. Gentry and A. Silverberg. Hierarchical ID-Based Cryptography. Advances in Cryptology—ASIACRYPT 2002. Springer Berlin Heidelberg (2002).
D. Boneh, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).
J. Shao and Z. Cao. CCA-Secure Proxy Re-Encryption without Pairings. Public Key Cryptography. Springer Lecture Notes in Computer Sciencevol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.

(56) References Cited

OTHER PUBLICATIONS

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

(56) References Cited

OTHER PUBLICATIONS

V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

(56) References Cited

OTHER PUBLICATIONS

Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

US 9,390,289 B2

SECURE COLLECTION SYNCHRONIZATION USING MATCHED NETWORK NAMES

BACKGROUND

1. Field

This disclosure is generally related to data security. More specifically, this disclosure is related to secure synchronization of collections in a network using exact match names.

2. Related Art

In many computing applications, it is often important for peers on a network to synchronize their respective collections of data. The proliferation of digital content creates a vast number of collections which require reconciliation. Content-Centric Network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified based on a unique name, which is typically a hierarchically structured variable length identifier (HSVLI) comprising contiguous name components ordered from a most general level to a most specific level.

In many computing applications, it is often important for devices in a network to express interests for their respective collections of data. The proliferation of digital content creates a vast number of collections which require reconciliation. CCN architectures have been designed to facilitate accessing such digital content. These networks include entities, or nodes, such as network clients, forwarders (e.g., routers and switches), and content producers, which communicate with each other by sending "interest" packets for various content items and receiving "response" packets comprising content objects in return. Unlike a traditional Internet Protocol (IP) network, where an object is tied to its location and its IP address, the content objects in a CCN are identified based on a specific name, which is location-independent and typically is an HSVLI.

For example, a border router that is connected to multiple areas of a computer network can subscribe to namespaces for those areas (e.g., "Area 1" and "Area 2"). Other routers that are not border routers may only subscribe to a single area. This way, a router that subscribes to the namespace "Area 1" only obtains network-configuration items for Area 1, and a router that subscribes to the namespace "Area 2" only obtains network-configuration items for Area 2. The border router that subscribes to both namespaces can obtain network-configuration items for Area 1 and Area 2.

Because a network-configuration item's structured name is unique and persistent, a node in a CCN can generate a hash value for each network-configuration item based on the structured name, without having to process the data for each content item. The node can also generate an additive hash for each routing-data collection, based on the hashes for the individual network-configuration items of a routing-data collection, so that the additive hash represents the contents of the routing-data collection. For example, the node can generate the additive hash by using an addition operation (or some other mathematical function) to process the hashes for the individual network-configuration items of the routing-data collection.

A typical CCN synchronization protocol uses a longest-prefix match method, where an interest in "/parc/events/" matches both "/parc/events/calendar.txt" and "/parc/events/conference.txt." As CCN architectures evolve, the synchronization protocol also evolves to allow the use of exact name match, rather than the current longest-prefix match. During synchronization, a node hosting a collection advertises the collection using its name. Any other node needing to synchronize the collection sends a request with the exact name and receives a response back comprising the collection. However, an adverse node can send a malicious advertisement. As a result, the node receiving the advertisement needs assurance that the advertisement is a valid one. Though CCN brings many desirable features to a network, some issues remain unsolved for secure synchronization of collections.

SUMMARY

One embodiment provides a system that facilitates secure synchronization of manifests using exact network names. During operation, the system generates an interest of advertisement comprising a name of a content object of the system. This name represents a collection of objects of the system and includes a first hash that is based on a key of the system. The first hash corresponds to a respective content object hash of one or more segments of a manifest representing the collection of objects. The system also determines a request for the content object based on the name in an interest of data from a remote node.

In a variation on this embodiment, the content object is a first segment of the manifest and comprises a second hash of a second segment of the manifest.

In a further variation, the system elects the manifest in the system for the interest of advertisement from a plurality of manifests with a same manifest hash. The plurality of manifests is distributed among a plurality of nodes.

In a variation on this embodiment, the content object is a secure catalog in the system. This secure catalog comprises the respective content object hash of the segments of the manifest; and the first hash is a hash of the secure catalog.

In a further variation, the system signs the secure catalog using the key of the system.

In a further variation, the system elects the secure catalog at the system for the interest of advertisement from a plurality of secure catalogs with a same content object hash. The plurality of secure catalogs is distributed among a plurality of nodes.

In a further variation, the secure catalog is distributed among a plurality of segments. A content object of a first segment of the secure catalog includes a hash of a content object of a second segment of the secure catalog.

In a variation on this embodiment, the system generates a message comprising a segment of the manifest in response to an interest of data from a remote node for the segment. The interest of data includes one of the content object hashes in the secure catalog.

In a variation on this embodiment, the key of the computing device identifies the computing device as a trusted publisher.

One embodiment provides a system that facilitates multi-object interest using network names. During operation, the system obtains a name of a content object of a remote node from an interest of advertisement. The name represents a collection of objects at the remote node and includes a first hash that is based on a key of the remote node. The first hash corresponds to a respective content object hash of one or more segments of a manifest representing the collection of objects. The system further generates for the remote node an interest of data comprising a request for the content object based on the name.

BRIEF DESCRIPTION OF THE FIGURES

In the figures, like reference numerals refer to the same figure elements.

DETAILED DESCRIPTION

Figure 1:
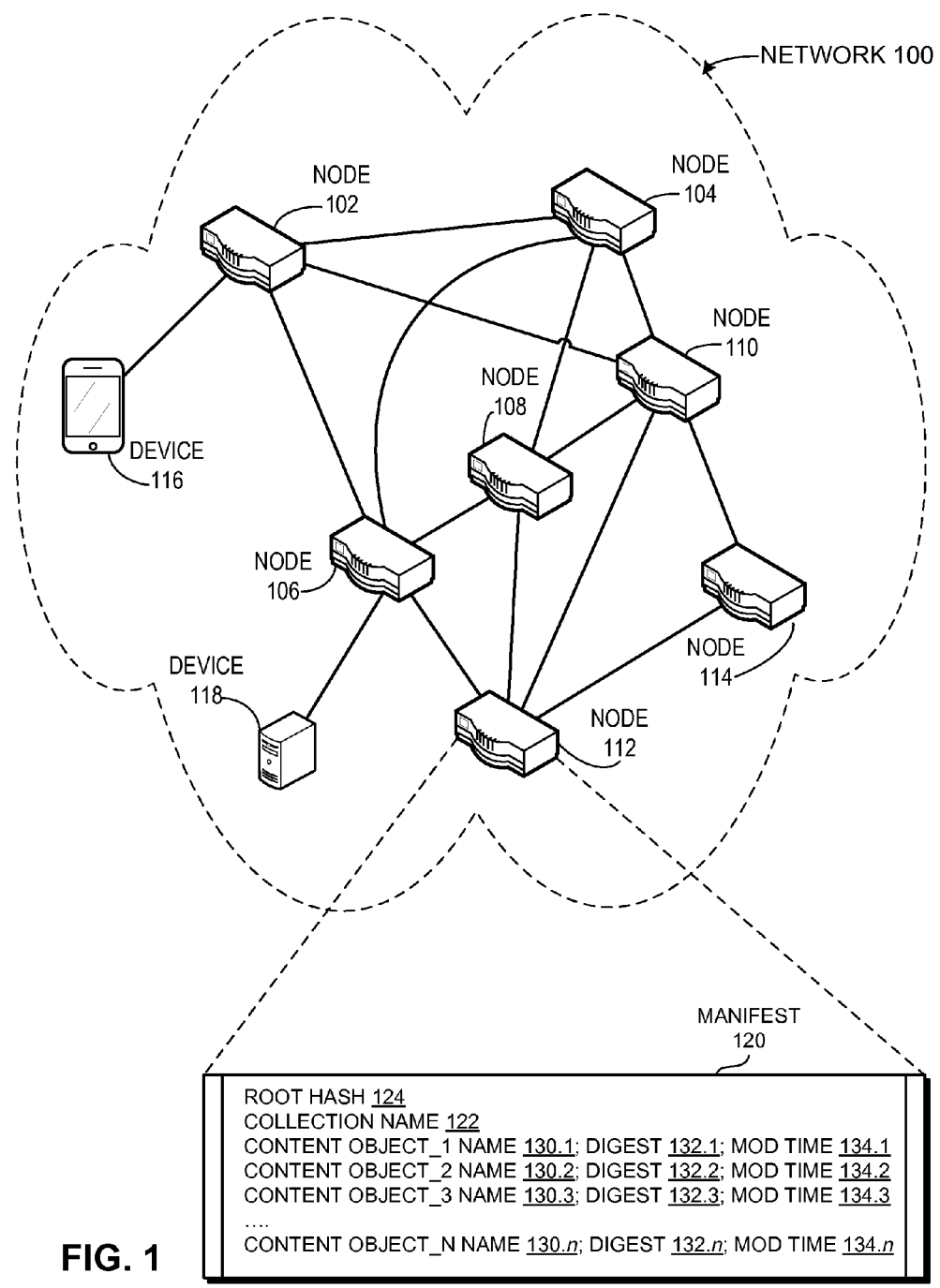
FIG. 1 illustrates an exemplary computer system that facilitates synchronization of manifests among nodes in a Content-Centric Network (CCN), in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of securely synchronizing a collection of objects using exact matched name is solved by incorporating a cryptographic hash with the interest for the collection of objects within the Content-Centric Network (CCN) namespace. In this disclosure, the terms "content object" and "object" are used interchangeably. With existing technologies, in a CCN, a host node can notify regarding a content object (i.e., a new content item), or an object, at any time by broadcasting an interest packet comprising the persistent name of the object. This interest packet can be referred to as an interest. Dissemination of interests allows other nodes to be aware of the object. In response to receiving an interest of advertisement, an interested node sends an interest of data to obtain the desired object. In response, the host node can send a response packet comprising the object. This response packet can be referred to as a response. In this disclosure, the terms "interest packet" and "interest" are used interchangeably. The terms "response packet" and "response" are also used interchangeably.

An interest of advertisement is an interest used for advertising a content object in a CCN. A node can send an interest of advertisement upon obtaining or updating a content object. On the other hand, an interest of data is an interest used for requesting a content object (i.e., data) in a CCN. A node can send an interest of data to express an interest (or request) for any content object.

In either interest, a name in the CCN namespace (e.g., a hierarchically structured variable length identifier (HSVLI)) is used to identify the content object. In some embodiments, the name includes an identification of the relevant namespace (or a namespace identification). This namespace identification is part of a CCN name which distinguishes between the interests. For example, the name can include "/adv" for advertisements and "/data" for data.

For a large collection of objects, sending a respective interest for a respective object leads to inefficient, bandwidth-intensive, and repetitive dissemination of interests. CCN can be extended to incorporate Manifest-Based Content Networking (MBCN). A content consumer node in a CCN can express an interest for a collection of objects using a manifest name representing the collection. In some embodiments, the manifest is an ordered list of objects in the collection. The manifest can include the respective names of the objects and their corresponding hash. By sending an interest of advertisement, which can also be referred to as an advertisement, for a manifest, a host node can make remote nodes aware of the collection. However, the host node can be malicious and send an adverse interest of advertisement.

To solve this problem, embodiments of the present invention incorporate a cryptographic hash with such an interest of advertisement. For example, this hash can be the part of the name of the manifest in the interest. In some embodiments, this secure synchronization with exact match names can be obtained using a hash chain. If the manifest is large and requires segmentation for dissemination, the interest of advertisement can include the hash of the first segment of the manifest. A respective segment, except the last one, can contain the hash of one or more subsequent segments in a designated field, thereby forming a hash chain. As a result, upon obtaining each segment, a node becomes aware of the hash of the next segment. In some embodiments, this secure synchronization with exact match names can be obtained using a secure catalog. The interest of advertisement can contain the hash of the secure catalog (or the first segment of the secure catalog). The secure catalog contains the hash of a respective segment of the manifest. By receiving the catalog, a node can obtain the respective hash of a respective manifest segment and send an interest for that segment using the corresponding hash.

Embodiments of the present invention provide a system which facilitates synchronization of manifests among nodes on a network by using exact match names. In the following description of embodiments of the present invention, the relevant CCN entities are a local node and a remote node, although the roles can be reversed. Each of the local and remote nodes is associated with a manifest, which represents a collection of content objects at a node. A manifest is identified by a specific prefix, such that two manifests with the same prefix correspond to the same collection of content objects.

In some embodiments, the manifest is an ordered list identifying a collection of content objects. Each content object in a collection is identified by its name and corresponding digest, where the digest is the hash value of the content object. In some embodiments, each content object is also identified by a modified time, which indicates the time that the content was modified. For the purposes of this description, the manifest is described as an ordered list, but other embodiments include the manifest structured as a synchronization tree, which contains content objects as well as nested collections of content objects. The system generates a root hash value for the manifest. The root hash value is an additive hash value based on the hash values of the individual content objects of the collection. The root hash value of the manifest is a unique identifier for the manifest.

The system can synchronize the collections in a local manifest with the contents in a local manifest using exact match names. A remote node advertises a hash of its manifest. A local node receives the advertisement and determines that the advertised remote manifest corresponds to a local manifest, where the remote manifest and the local manifest correspond to the same collection of content objects. The local node determines whether the contents of the local manifest are synchronized with the contents of the remote manifest by comparing the root hash value of the local manifest with the root hash value of the remote manifest. If they do not match, then the local node retrieves the remote manifest by sending a request for the remote manifest to the remote node.

In some embodiments, the local node sends a set of interests based on a segmentation protocol, and each interest corresponds to a numbered segment of the manifest. In some embodiments, the remote node can advertise the number of segments corresponding to its manifest. The local node, in possession of the remote manifest, determines which content objects indicated in the remote manifest are different from the content objects indicated in the local manifest. Subsequently, the local node transmits a set of interests for the content objects that are different, where the interest includes the name of the requested content object. In some embodiments, the interest also includes the corresponding hash value of the requested content object. In this manner, the system uses an exact name match to request and receive the set of different content objects.

In some embodiments, the manifest is transmitted using a structured technique, such as the rolling hash technique in the rsync protocol, rather than sending the complete manifest. The rsync protocol allows efficient transmission of the manifest between two nodes because the nodes already have a similar, but not identical, version of the same manifest.

In some embodiments, a content object in a collection is further identified by a corresponding modified time, which indicates the time the content object was modified. For each content object that is determined to be different, the local node determines whether the modified time of the content object in the remote manifest is more or less recent than the corresponding content object in the local manifest. If the remote content object corresponds to a modified time that is more recent, then the local node updates the value of the content object in the local manifest with the value of the content object from the remote manifest. A description of how to remove, or "white-out," a content item from a data collection is contained in U.S. patent application Ser. No. 13/681,306, titled "Data Transport by Named Content Synchronization," by inventors Van L. Jacobson and Marc E. Mosko, filed 19 Nov. 2012, the disclosure of which is incorporated by reference herein.

In some embodiments, if the remote content object corresponds to a modified time that is less recent, the system can determine whether to retain the history by inserting the value of the content object from the remote manifest in a history field of the corresponding content object in the local manifest. The system updates the values accordingly for each content object that is determined to be different. In this manner, the system synchronizes the manifest at a local node with the manifest at a remote node.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independently of the data's storage location, network location, application, and means of transportation. Named Data Networks (NDNs) or CCNs are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location-independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated herein by reference. A name can also be a flat label. Hereinafter, "name" is used to refer to any name of a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) of the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a CCN architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated herein by reference.

In this disclosure, the description in conjunction with FIGS. 1-6 is associated with the general architecture of synchronization of a collection of objects using a manifest; and the description in conjunction with FIG. 7 and onward provides more details on the mechanism for facilitating a secure synchronization of the collection objects.

Exemplary Network and Manifest

FIG. 1 illustrates an exemplary computer system that facilitates synchronization of manifests among nodes in a CCN, in accordance with an embodiment of the present invention. In the example in FIG. 1, network 100 facilitates synchronization of manifests among nodes in a CCN. Network 100 can include a client device 116 (or consumer 116), a content producing device 118 (or producer 118), and a router or other forwarder at nodes 102, 104, 106, 108, 110, 112, and 114. Nodes 102-114 can each contain one or more manifests. For example, node 112 contains a manifest 120. Manifest 120 comprises a collection name 122 and an ordered list of content objects identified by one or more of the following: a content object name 130.1-130.$n$; a digest 132.1-132.$n$, and a modified time 134.1-134.$n$. The digests 132.1-132.$n$ comprise a hash value of the content object identified respectively by names 130.1-130.$n$. In some embodiments, a digest can be an SHA-256 hash of the content object, where the likelihood of a hash collision (where the one-way hash of two different content objects results in the same value) is sufficiently low such that the digest is a unique identifier for the content object. Manifest 120 also includes a root hash 124, which is an additive hash value based on the digests (i.e., hash values) 132.1-132.$n$ of the individual content objects of the collection. Root hash 124 is a unique identifier for manifest 120 and represents the content objects in the collection.

In some embodiments, a manifest indicates a name and a corresponding digest, but does not indicate a modified time. Such a system can include, e.g., a file server where prior versions of a text file are important and thus retained by the system. In other embodiments, a manifest indicates a name, a corresponding digest, and a modified time. The system can use the modified time to determine which version of the content item should be retained. For example, if the content items indicate a link state, then the system does not need information relating to previous versions. In this case, only the content object with the most recent modified time is retained.

Any two nodes in a network can contain a manifest that represents the same collection of data, where the manifests can be synchronized using the methods described herein. The terms "local node" and "remote node" can apply to any node in a content-centric network (CCN) and are used in this disclosure to differentiate between two nodes in a CCN.

Structure of Names

Synchronization of manifests representing the same collection of data between two nodes is based on a three-part name. The first part is a routable prefix that identifies the collection, such as "/a/b." The second part contains an identification of the relevant namespace (or a namespace identification), and can be "/adv" for advertisements or "/data" for data transfers. The third part is the hash value or content being advertised or transferred. Thus, a CCN name is of the form:

/collection_prefix/adv_or_data/protocol_data

An example of an interest sending a hash advertisement is:

/a/b/adv/<roothash>

A local node receiving this advertisement and containing a local manifest with the same routable prefix "/a/b" retrieves the advertised manifest in segments 0, 1, . . . up to the ending segment number m based on a segmentation protocol. Such an interest looks like:

/a/b/data/<roothash>/<segment number>

Based on the entries in the retrieved manifest, the system determines which content objects identified in the retrieved manifest are different from the content objects identified in the local manifest. The system retrieves the different content objects based on the name of the content object:

/a/b/data/<name of content object>

In some embodiments, the system retrieves the different content objects based on the hash value of the requested content object:

/a/b/data/<hash(content object)>

In some embodiments, the system retrieves the different content objects based on the name in the manifest. This technique allows the system to retrieve any cached copy of the object rather than using the name of the content under the collection's namespace. For example, to retrieve the first item from manifest 140 in FIG. 6B, the system sends an Interest for the name and digest:

/chef/events/calendar.txt, digest={1}

Communication and Synchronization of Manifests Between Two Nodes

Figure 2:
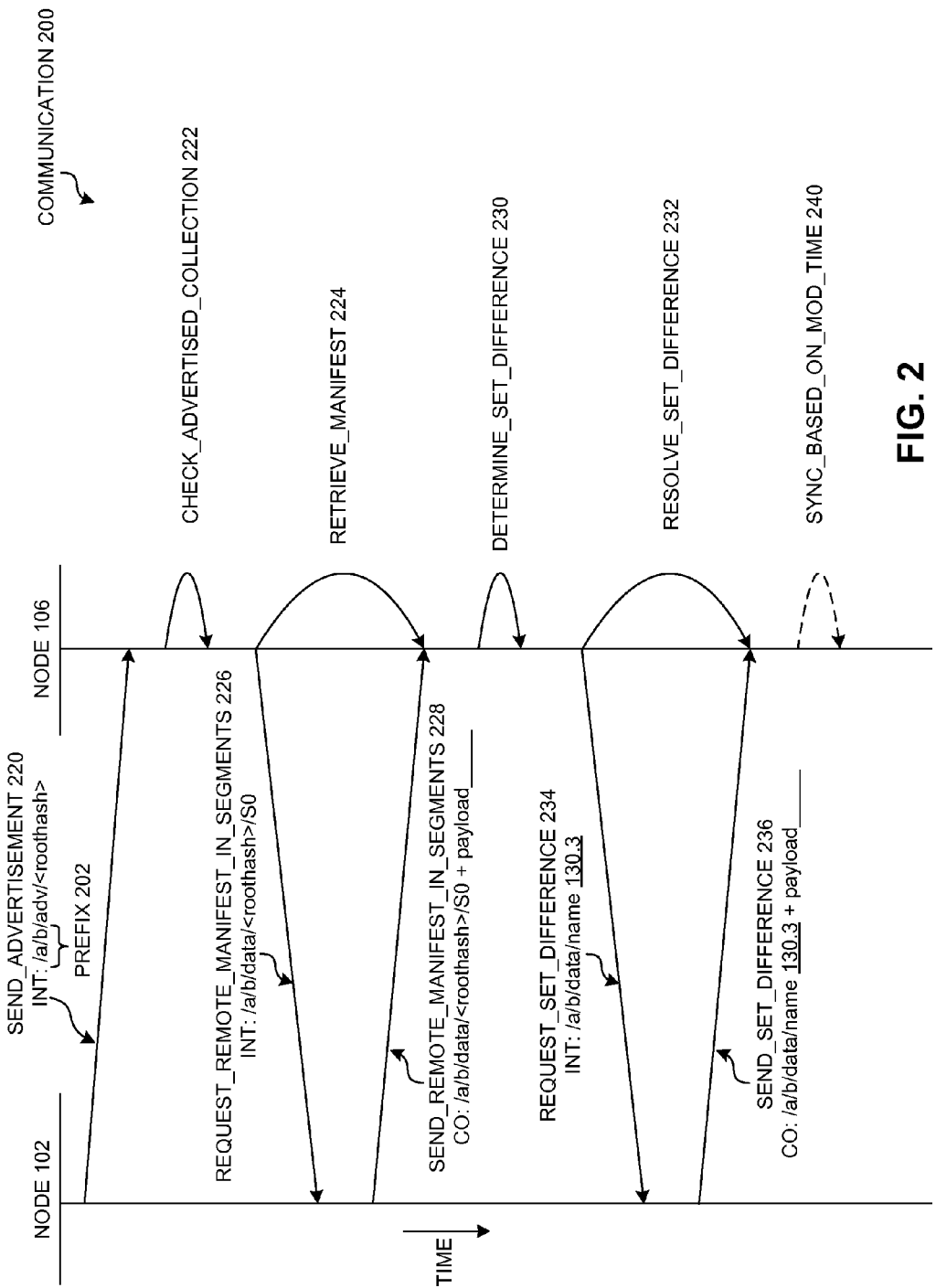
FIG. 2 illustrates exemplary communication between a local node and a remote node, in accordance with an embodiment of the present invention.

FIG. 2 illustrates exemplary communication between a local node and a remote node, in accordance with an embodiment of the present invention. A communication 200 between node 102 (remote node) and node 106 (local node) facilitates synchronization of a collection of objects based on a manifest. Nodes 102 and 106 each contain a manifest with the same routing prefix 202, or collection name, "/a/b." Remote node 102 transmits a send_advertisement interest 220 (i.e., an interest of advertisement), which is a hash advertisement containing the root hash value of its manifest identified by collection name "/a/b." The interest takes the form of: "/a/b/adv/<roothash>." Local node 106 receives the advertised interest and performs a check_advertised_collection procedure 222 to determine whether node 106 contains a manifest indicating a same collection as the advertised manifest, based on the same collection prefix 202 ("/a/b"). Then, local node 106 determines whether the root hash of its local manifest is different from the root hash of the remote manifest. Differing hash values indicate that the collections need to be synchronized with each other. Local node 106 then performs a retrieve_manifest procedure 224, by sending a set of interests for the manifest. The set of interests is segmented based on a segmentation protocol. The interests are sent in a request_remote_manifest_in_segments interest 226 (i.e., an interest of data), and are of the form: "/a/b/datakroothash>/S0," "/a/b/datakroothash>/S1," "/a/b/datakroothash>/S2," etc. In some embodiments, the advertising node can include the number of segments required to transfer its manifest. In a send_remote_manifest_in_segments message 228, remote node 102 sends the requested manifest back in response to the set of interests. The requested content objects take the form: "/a/b/datakroothash>/S0+payload" where the payload contains the requested segment of the manifest.

Local node 106, in possession of the remote manifest, performs a determine_set_difference procedure 230. In some embodiments, the result of this procedure is a list of content objects identified by name. In other embodiments, the result is a list of content objects identified by their corresponding digest. Local node 106 then transmits a request_set_difference interest 234 for each content object that is determined to be different. The interest takes the form, e.g.: "/a/b/data/name 130.3". Local node 106 receives the requested content object when remote node 102 transmits a send_set_difference content object 236, where the requested content object takes the form: "/a/b/data/name 130.3+payload." Thus, local node 106 performs resolve_set_difference procedure 232 by requesting and receiving the content objects determined to be different such that the contents of the local manifest are synchronized with the contents of the remote manifest. In some embodiments, local node 106 performs a sync_based_on_mod_time procedure 240, which is described below in relation to FIG. 4.

Figure 3:
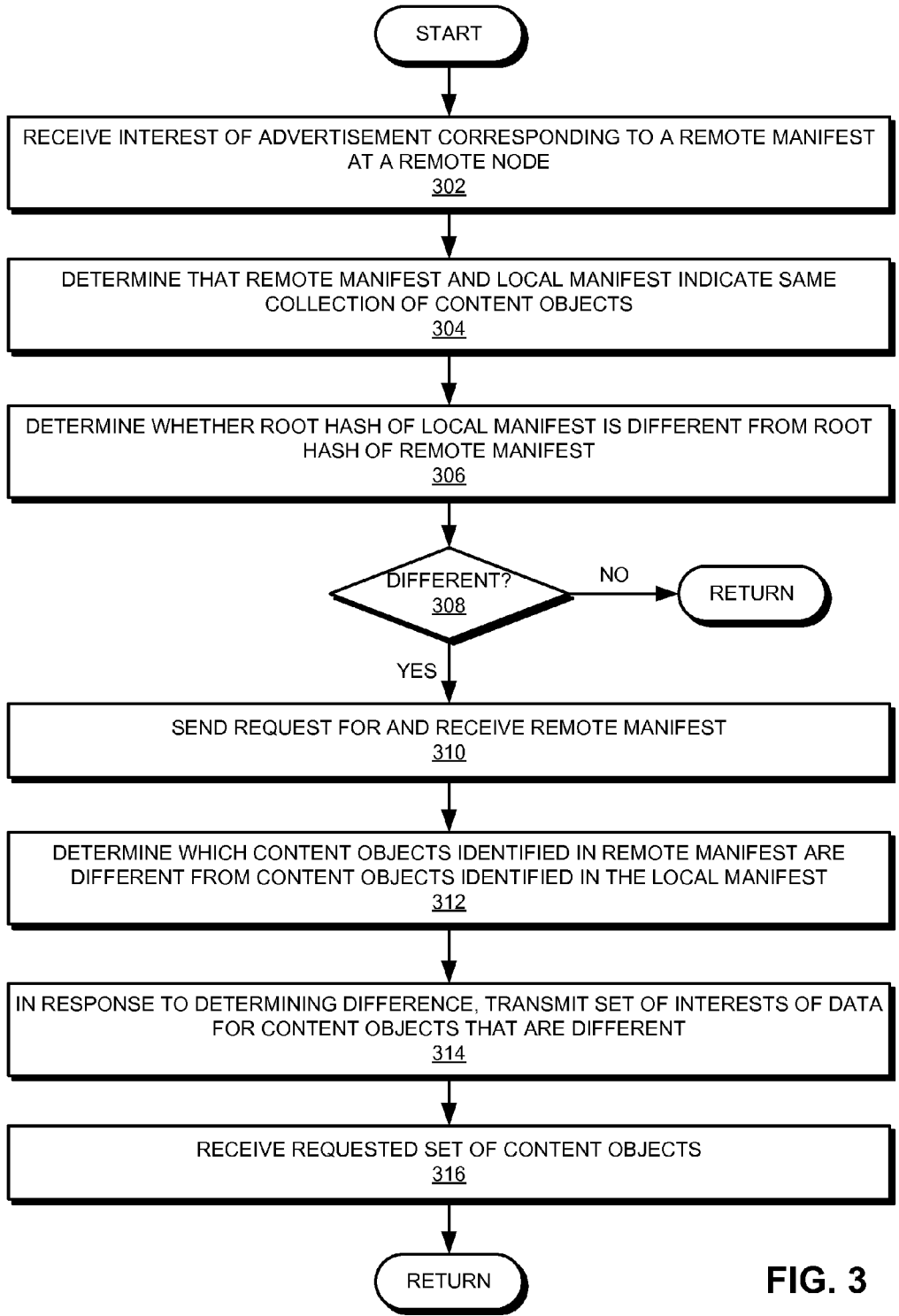
FIG. 3 presents a flowchart illustrating the process of synchronizing content associated with a remote manifest and a local manifest, in accordance with an embodiment of the present invention.

FIG. 3 presents a flowchart illustrating the process of synchronizing content associated with a remote manifest and a local manifest, in accordance with an embodiment of the present invention. In the example in FIG. 2, node 106 can be a local node and node 102 can be the remote node. During operation, a local node receives an interest of advertisement corresponding to a remote manifest at a remote node (operation 302). A manifest represents a collection of content objects at a node. The local node determines that the remote manifest and the local manifest indicate the same collection of content objects (operation 304, corresponding to check_advertised_collection procedure 222 in FIG. 2).

In some embodiments, the local node determines if the manifest indicates the same collection by comparing the collection name, or routing prefix, of the manifests. The local node then determines whether the root hash value of its local manifest is different from the root hash value of the remote manifest (operation 306). The root hash value of a manifest is a unique identifier for the manifest, and comprises an additive hash value of the digests of the content objects represented in the manifest. If the root hash value of the local manifest is not the same as the root hash value of the remote manifest (operation 308), the local and remote manifests, which represent the same collection, are not synchronized and need to be reconciled. The local node downloads or transfers the remote manifest by sending a request for, and receiving in response to the request, the remote manifest (operation 310, corresponding to retrieve_manifest procedure 224 in FIG. 2).

The local node determines which content objects identified in the remote manifest are different from the content objects identified in the local manifest (operation 312, corresponding to the determine_set_difference procedure 230 in FIG. 2). In some embodiments, the local node determines the set difference by comparing the digests of the content objects identified in the local manifest with the digests of the same named content objects identified in the remote manifest. If the local node determines a difference, the local node transmits a set of interests of data corresponding to the determined different set of content objects (operation 314), and receives the requested content objects in return (operation 316). This corresponds to the resolve_set_difference procedure 232 shown in FIG. 2. Thus, the contents of the local manifest are synchronized with the contents of the remote manifest.

If the local node has changes, the local node advertises the new root hash value. It can do so immediately, or schedule a next advertisement based on network or other timing considerations. For example, the local node can advertise its root hash at least once per second, but no more than four times a second. Therefore, during reconciliation, as the root hash changes due to updates, the node can advertise up to four changes per second. Otherwise, in a steady state, the node can advertise once per second.

Synchronization Based on Modified Time

Figure 4:
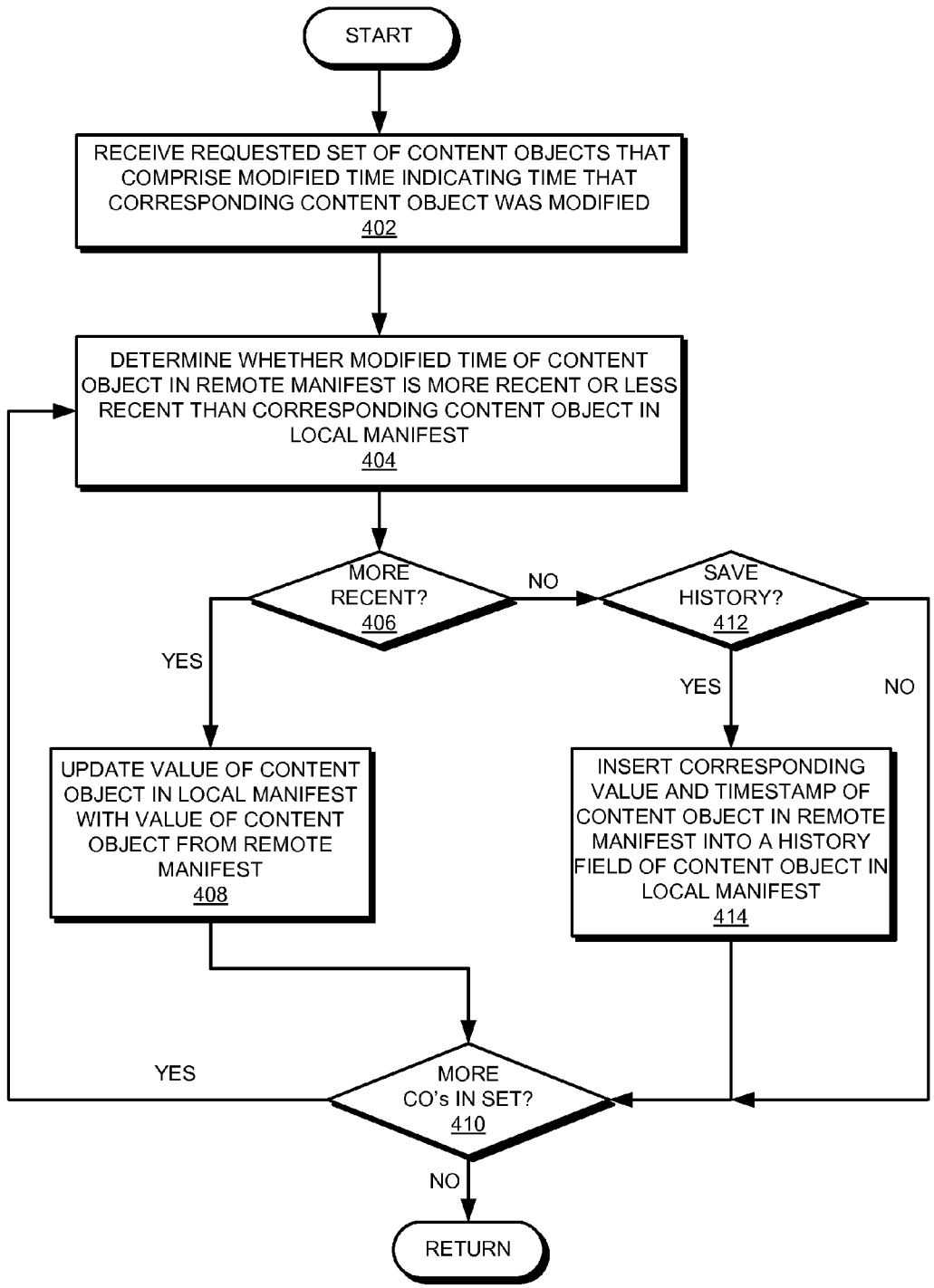
FIG. 4 presents a flowchart illustrating the process of synchronizing content associated with a remote manifest and a local manifest based on a modified time, in accordance with an embodiment of the present invention

FIG. 4 presents a flowchart illustrating the process of synchronizing content associated with a remote manifest and a local manifest based on a modified time, in accordance with an embodiment of the present invention. Note that the synchronization of content can also be based on a sequence number associated with a content object, where a greater sequence number indicates a more recent version of the content object. Synchronization of content can also be based on an ordering of the names of the content objects, where an implicit sort order indicates a more recent version of the content object. This process is represented as sync_based_on_mod_time procedure 240 in FIG. 2. Based on the previously determined set difference, a local node receives a requested set of content objects that include a modified time indicating a time that a corresponding content object was modified (operation 402). For each content object, the local node determines whether the modified time of the content object in the remote manifest is more recent or less recent than the corresponding content object in the local manifest (operation 404). If the modified time of the content object from the remote manifest is more recent (operation 406), then the system updates the value of the content object in the local manifest with the value of the content object from the remote manifest (operation 408). In some embodiments, the local node can determine whether to retain the value of its (less recent) content object in the local manifest by inserting a corresponding value and modified time of the (less recent) content object into a history field in the local manifest before updating the value of the content object in the local manifest. If there are more content objects in the set that need to be retrieved (operation 410), then the system returns to operation 404. If not, then the system has finished retrieving the necessary content objects.

If the modified time of the content object from the remote manifest is less recent than the corresponding content object in the local manifest (operation 406), then the system determines whether to save the value of the (less recent) content object from the remote manifest (operation 412) by inserting a corresponding value and modified time of the (less recent) content object into a history field in the local manifest (operation 414). If there are more content objects in the set that need to be retrieved (operation 410), then the system returns to operation 404. If not, then the system has finished retrieving the necessary content objects. Thus, all content objects determined to be different have been updated, and possibly retained or saved in a history field of the local manifest, such that the contents of the local manifest are synchronized with the contents of the remote manifest.

Transmitting Advertisement, Manifest, and Contents for Synchronization

Figure 5:
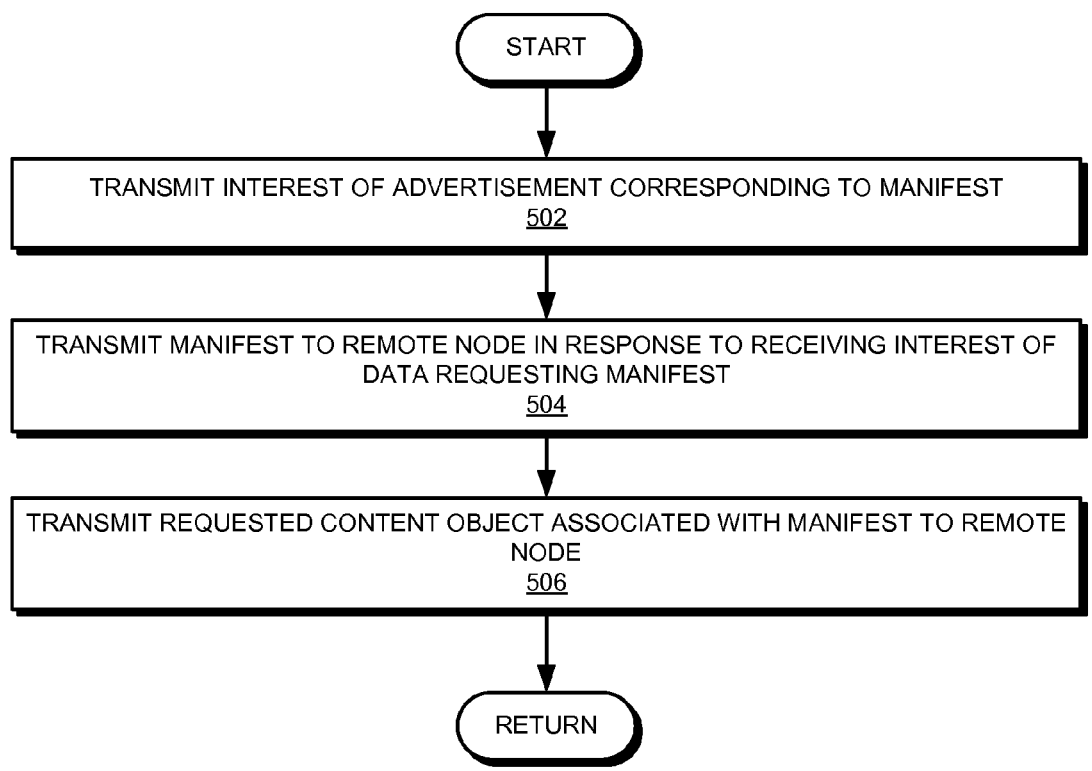
FIG. 5 presents a flowchart illustrating the process of transmitting an advertisement corresponding to a manifest, in accordance with an embodiment of the present invention.

FIG. 5 presents a flowchart illustrating the process of transmitting an advertisement corresponding to a manifest, in accordance with an embodiment of the present invention. The node in FIG. 5 is described as a local node because it transmits packets to a remote node. Note that the local node in FIG. 5 corresponds to node 102 in FIG. 2, which has been previously referred to as remote node 102. It should be noted that any node in a CCN can be referred to as a remote node or a local node.

A local node transmits an interest of advertisement corresponding to a manifest, where the manifest represents a collection of content objects at a node (operation 502, corresponding to send_advertisement message 220 in FIG. 2). This advertisement is an interest that is akin to a beacon and, based on the "/add" namespace identification used, does not request any content in return. Upon receiving an interest of data from a remote node requesting the manifest, the local node transmits the manifest to the remote node (operation 504, corresponding to receiving request_remote_manifest_in_segments interest 226 and send_remote_manifest_in_segments message 228 in FIG. 2). Upon receiving a request from a remote node for a content object identified in the local manifest, the local node transmits the requested content object to the requesting remote node (operation 506, corresponding to receiving request_set_difference interest 234 and send_set_difference message 236 in FIG. 2).

Manifest Contents During Synchronization

Figure 6A:
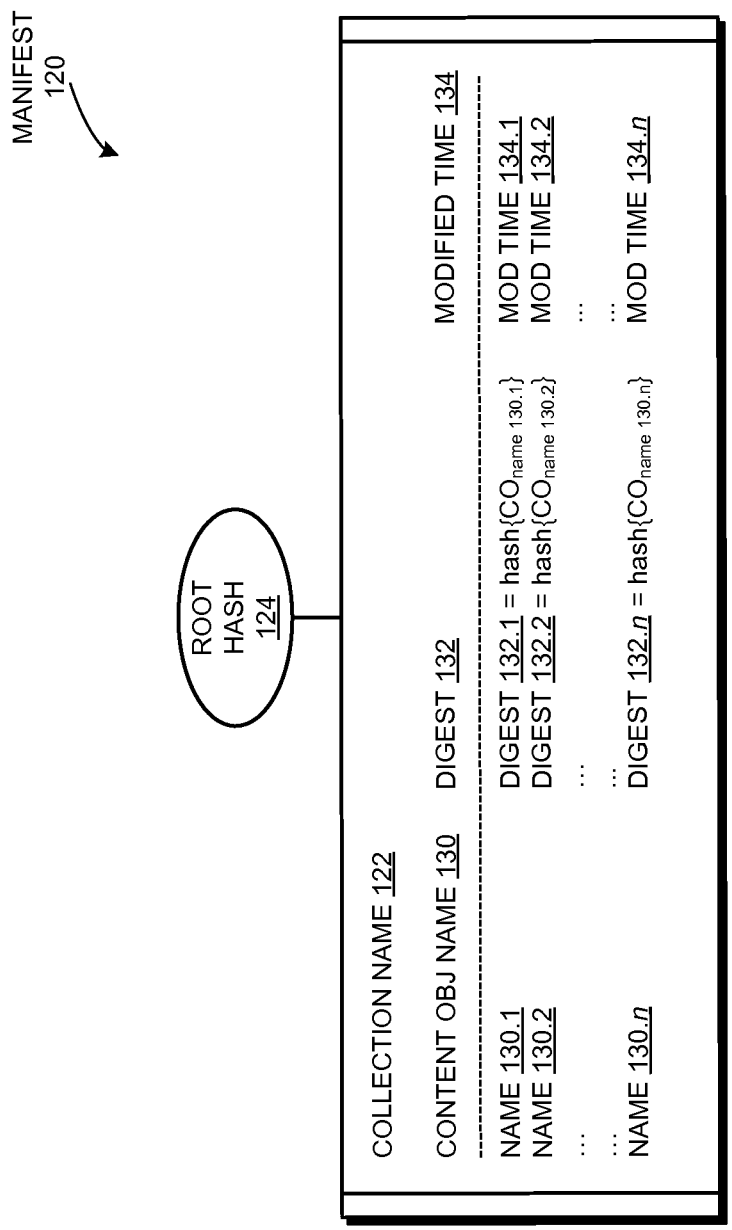
FIG. 6A presents a table depicting the format of a manifest and the content objects represented in the collection, in accordance with an embodiment of the present invention.

FIG. 6A presents a table depicting the format of a manifest and the content objects represented in the collection, in accordance with an embodiment of the present invention. Manifest 120 comprises an ordered list of content objects identified by a collection name 122 and one or more of the following: a content object name 130.1-130.*n*; a digest 132.1-132.*n*; and a modified time 134.1-134.*n*. The digests 132.1-132.*n* comprise a hash value of the content object identified respectively by names 130.1-130.*n*. Manifest 120 also includes a root hash 124, which is an additive hash value based on the hash values 132.1-132.*n* of the individual content objects of the collection. Root hash 124 of manifest 120 is a unique identifier for manifest 120.

As described in relation to FIG. 1, manifest 120 can indicate a name and corresponding digest for each content object represented in the collection. In some embodiments, manifest 120 can also include a modified time for each content object represented in the collection. The use of the modified time field depends on the underlying application or service being performed. Note that manifest 120 indicates collection name 122. The manifests depicted in FIGS. 6B-E also include a collection name, but because the exemplary manifests comprise the same collections of data, the collection name is not included in FIGS. 6B-6E.

FIGS. 6B-6E depict two nodes, nodes 102 and 106, each of which contains a manifest. In this example, node 102 is the remote node and node 106 is the local node. Local node 106 contains a manifest 160, and remote node 102 contains a manifest 140. Manifests 140 and 160 contain the same collection name, or routing prefix, and thus represent the same collection of content objects or data. Time is indicated by the labels T1, T2, etc., and the contents of manifests 140 and 160 are depicted in relation to these time labels.

Recall that a manifest is further identified by a root hash value, illustrated as root hash 124 in FIG. 6A, which is an additive hash value based on the digests of the individual content objects of the collection. In the following examples, the root hash value and the digests are indicated as a number in brackets, e.g., "{999}", although the number can be much larger than this. In addition, both the digests of the content objects and the exemplar root hash values of manifests 140 and 160 that change over time are depicted only as sample representations of additive hash values.

Local Manifest Missing a Content Object from Remote Manifest

Figure 6B:
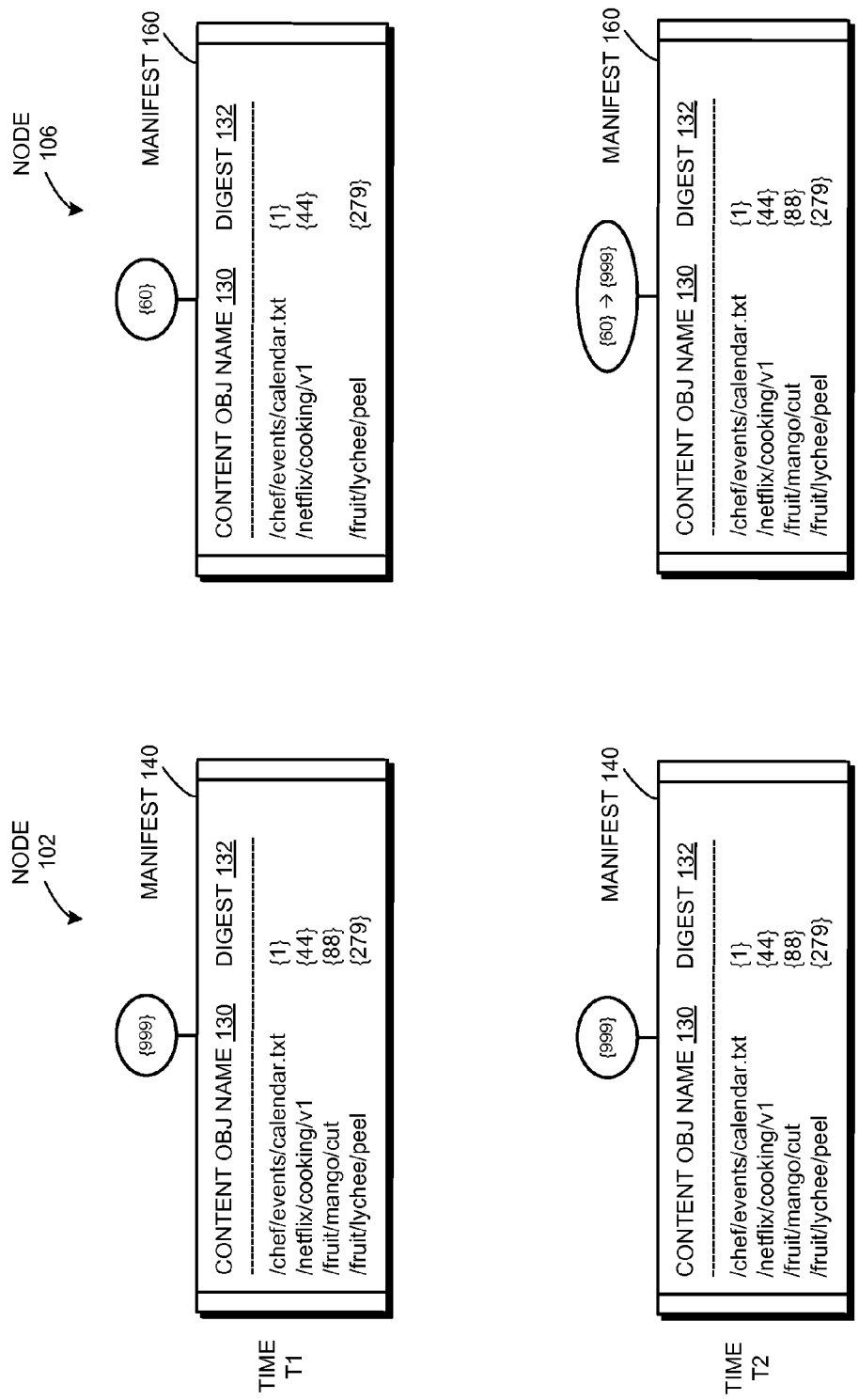
FIG. 6B presents tables depicting the format of two manifests during synchronization, where the local manifest is missing a content object from the remote manifest, in accordance with an embodiment of the present invention.

FIG. 6B presents tables depicting the format of two manifests during synchronization, where the local manifest is missing a content object from the remote manifest, in accordance with an embodiment of the present invention. At time T1, local node 106 receives a hash advertisement from remote node 102 of manifest 140, with a root hash of {999}. Local node 106 determines that its manifest 160 represents the same collection of data as remote manifest 140 and retrieves manifest 140. Local node 106 determines that local manifest 160, with a root hash of {60}, is not synchronized with remote manifest 140, which has a root hash of {999}. Local node 106 then determines the set difference between its local manifest 160 and remote manifest 140. In this example, manifest 160 is missing the content object identified by the name of "/fruit/lychee/peel," so local node 106 sends an interest to remote node 102 for the content object by that name. Remote node 102 returns the requested content object. At time T2, local node 106 updates its manifest 160 with the missing content object. Based on the contents of manifest 160 at time T2, the system generates a new root hash for manifest 160, which now equals the root hash of the remote manifest. This is depicted by the root hash value of manifest 160 at time T2: {60}→{999}. Thus, the local manifest and the remote manifest have synchronized their collections and both contain the same root hash value of {999}.

Figure 6C:
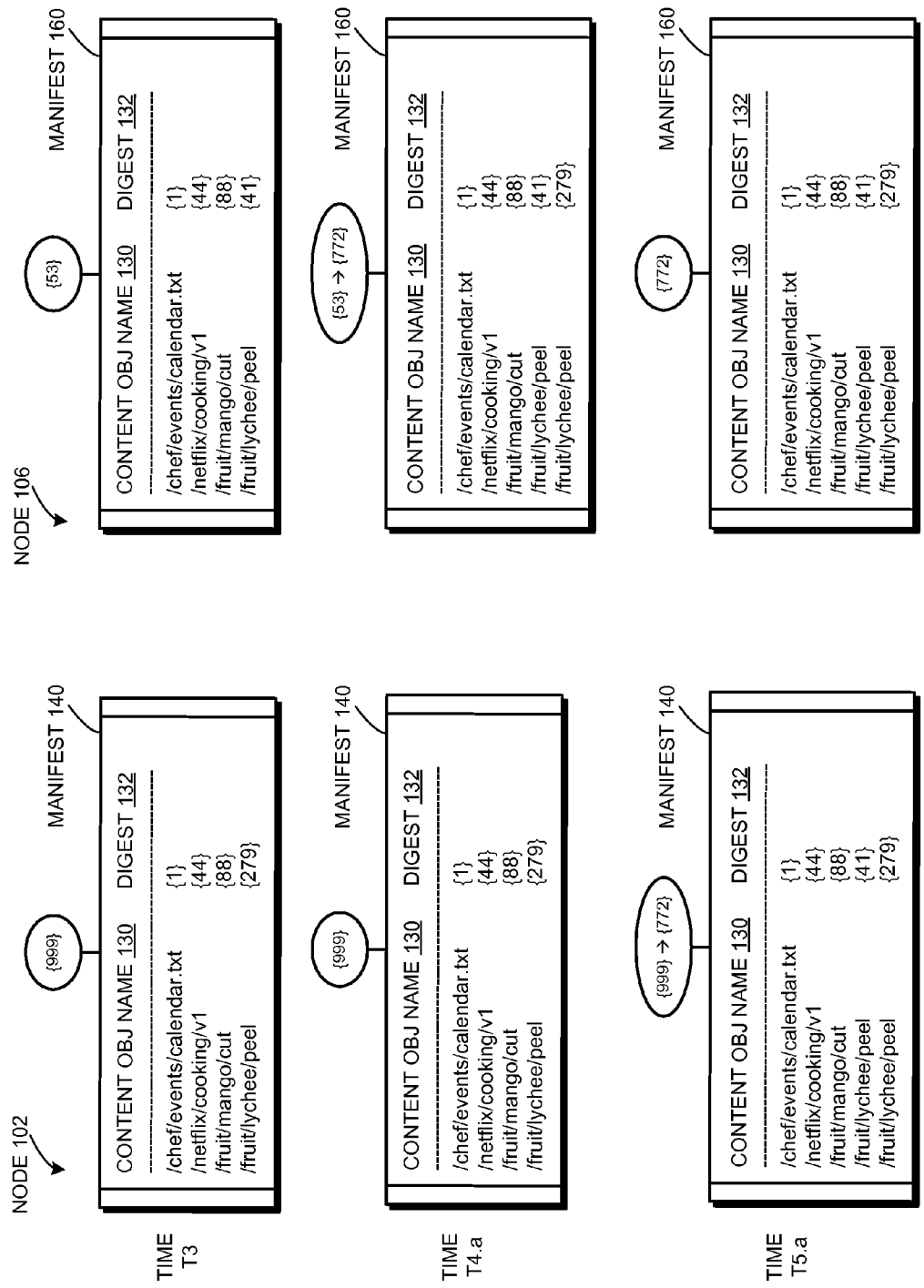
FIG. 6C presents tables depicting the format of two manifests during synchronization, where the digest of a same named content object in the local manifest is different from the digest in the remote manifest, and where the remote node advertises its manifest, in accordance with an embodiment of the present invention.

Local and Remote Manifests Contain Content Object with Same Name, but Different Digest: Local Node Retrieves Manifest First FIG. 6C presents tables depicting the format of two manifests during synchronization, where the digest of a same named content object in the local manifest is different from the digest in the remote manifest, and where the remote node advertises its manifest, in accordance with an embodiment of the present invention. At time T3, local node 106 receives a hash advertisement from remote node 102 of manifest 140, with a root hash of {999}. Local node 106 determines that its manifest 160 represents the same collection of data as remote manifest 140 and retrieves manifest 140. Local node 106 determines that local manifest 160, with a root hash of {53}, is not synchronized with remote manifest 140, which has a root hash of {999}. Local node 106 then determines the set difference between its local manifest 160 and remote manifest 140. In this example, manifest 160 is missing the content object identified by the name of "/fruit/lychee/peel" with a digest of {279}, so local node 106 sends an interest to remote node 102 for the content object based on that name and digest. Remote node 102 returns the requested content object. At time T4.*a*, local node 106 updates its manifest 160 with the missing content object. Based on the contents of manifest 160 at time T4.*a*, the system generates a new root hash for manifest 160. This is depicted by the root hash value of manifest 160 at time T4.*a*: {53} {772}. However, manifest 140, with its original root hash of {999}, is now out of sync with manifest 160, which has the new root hash of {772}.

Subsequently, remote node 102 receives a hash advertisement from local node 106 of manifest 160, with the new root hash of {772}. Remote node 102 determines that its manifest 140 represents the same collection of data as manifest 160 and retrieves manifest 160. Remote node 102 determines that manifest 140, with a root hash of {999}, is not synchronized with manifest 160, which has a root hash of {772}. Remote node 102 then determines the set difference between its manifest 140 and manifest 160. In this example, manifest 140 is missing the content object identified by a name of "fruit/lychee/peel" with a digest of {41}, so remote node 102 sends an interest to local node 106 for the content object based on that name and digest. Local node 106 returns the requested content object. At time T5.*a*, remote node 102 updates it manifest 140 with the missing content object. Based on the contents of manifest 140 at time T5.*a*, the system generates a new root hash for manifest 140. This is depicted by the root hash value of manifest 140 at time T5.*a*: {999}≠{772}. Thus, at time T5.*a*, manifest 140 at node 102 is in sync with manifest 160 at node 106. Nodes 102 and 106 have synchronized their collections and both contain the same root hash value of {772}.

Figure 6D:
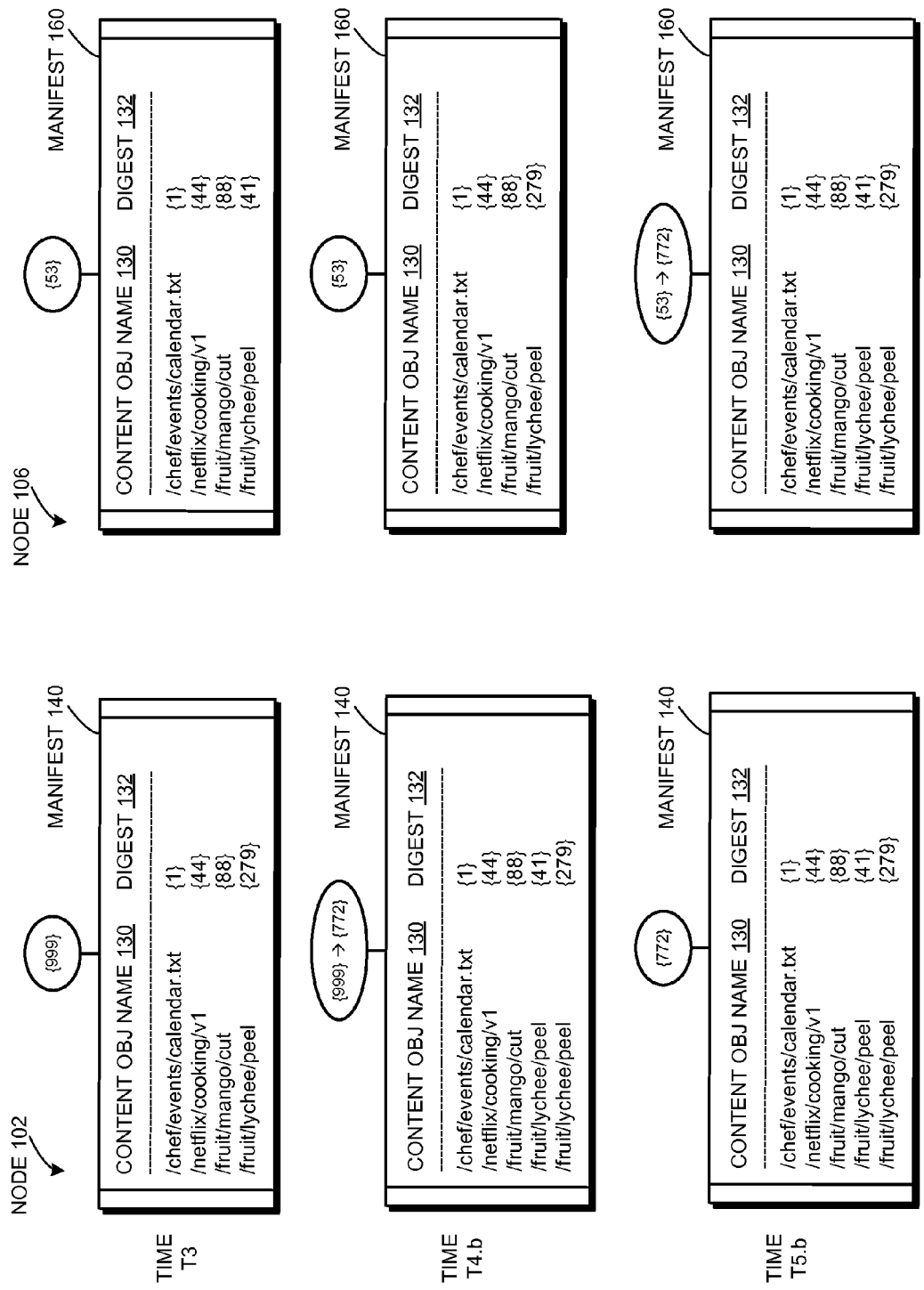
FIG. 6D presents tables depicting the format of two manifests during synchronization, where the digest of a same named content object in the local manifest is different from the digest in the remote manifest, and where the local node advertises its manifest, in accordance with an embodiment of the present invention.

Local and Remote Manifests Contain Content Object with Same Name, but Different Digest: Remote Node Retrieves Manifest First FIG. 6D presents tables depicting the format of two manifests during synchronization, where the digest of a same named content object in the local manifest is different from the digest in the remote manifest, and where the local node advertises its manifest, in accordance with an embodiment of the present invention. At time T3, remote node 102 receives a hash advertisement from local node 106 of manifest 160, with a root hash of {53}. Remote node 102 determines that its manifest 140 represents the same collection of data as manifest 160 and retrieves manifest 160. Remote node 102 determines that its manifest 140, with a root hash of {999}, is not synchronized with manifest 160, which has a root hash of {53}. Remote node 102 then determines the set difference between its manifest 140 and manifest 160. In this example, manifest 140 is missing the content object identified by the name of "/fruit/lychee/peel" with a digest of {41}, so remote node 102 sends an interest to local node 106 for the content object based on that name and digest. Local node 106 returns the requested content object. At time T4.*b*, remote node 102 updates its manifest 140 with the missing content object. Based on the contents of manifest 140 at time T4.*b*, the system generates a new root hash for manifest 140. This is depicted by the root hash value of manifest 140 at time T4.*b*: {999}≠{772}. However, manifest 160, with its original root hash of {53}, is now out of sync with manifest 140, which has a new root hash of {772}.

Subsequently, local node 106 receives a hash advertisement from remote node 102 of manifest 140, with the new root hash of {772}. Local node 106 determines that its manifest 160 represents the same collection of data as manifest 140 and retrieves manifest 140. Local node 106 determines that its manifest 160, with a root hash of {53}, is not synchronized with manifest 140, which has a root hash of {772}. Local node 106 then determines the set difference between its local manifest 160 and remote manifest 140. In this example, manifest 160 is missing the content object identified by the name of "/fruit/lychee/peel" with a digest of {41}, so local node 106 sends an interest to remote node 102 for the content object based on that name and digest. Remote node 102 returns the requested content object. At time T5.*b*, local node 106 updates its manifest 160 with the missing content object. Based on the contents of manifest 160 at time T5.*b*, the system generates a new root hash for manifest 160. This is depicted by the root hash value of manifest 160 at time T5.*b*: {53} ≠ {772}. Thus, at time T5.*b*, manifest 140 at node 102 is in sync with manifest 160 at node 106. Nodes 102 and 106 have synchronized their collections and both contain the same root hash value of {772}.

FIGS. 6C and 6D illustrate that any node can be a remote or a local node, and that the order of sending or receiving hash advertisements, manifests, and content objects determined to be different associated with the manifest may differ depending on the contents in a collection at a given time, e.g., the contents of manifests 140 and 160 at times [T3, T4.*a*, T5.*a*] and at times [T3, 15 T4.*b*, T5.*b*]. That is, any node can send or receive a hash advertisement, transfer a manifest, and synchronize the contents of a manifest at the node using the methods described in this disclosure, thereby resulting in the synchronization of data collections at two nodes.

Synchronization Using Modified Time

Figure 6E:
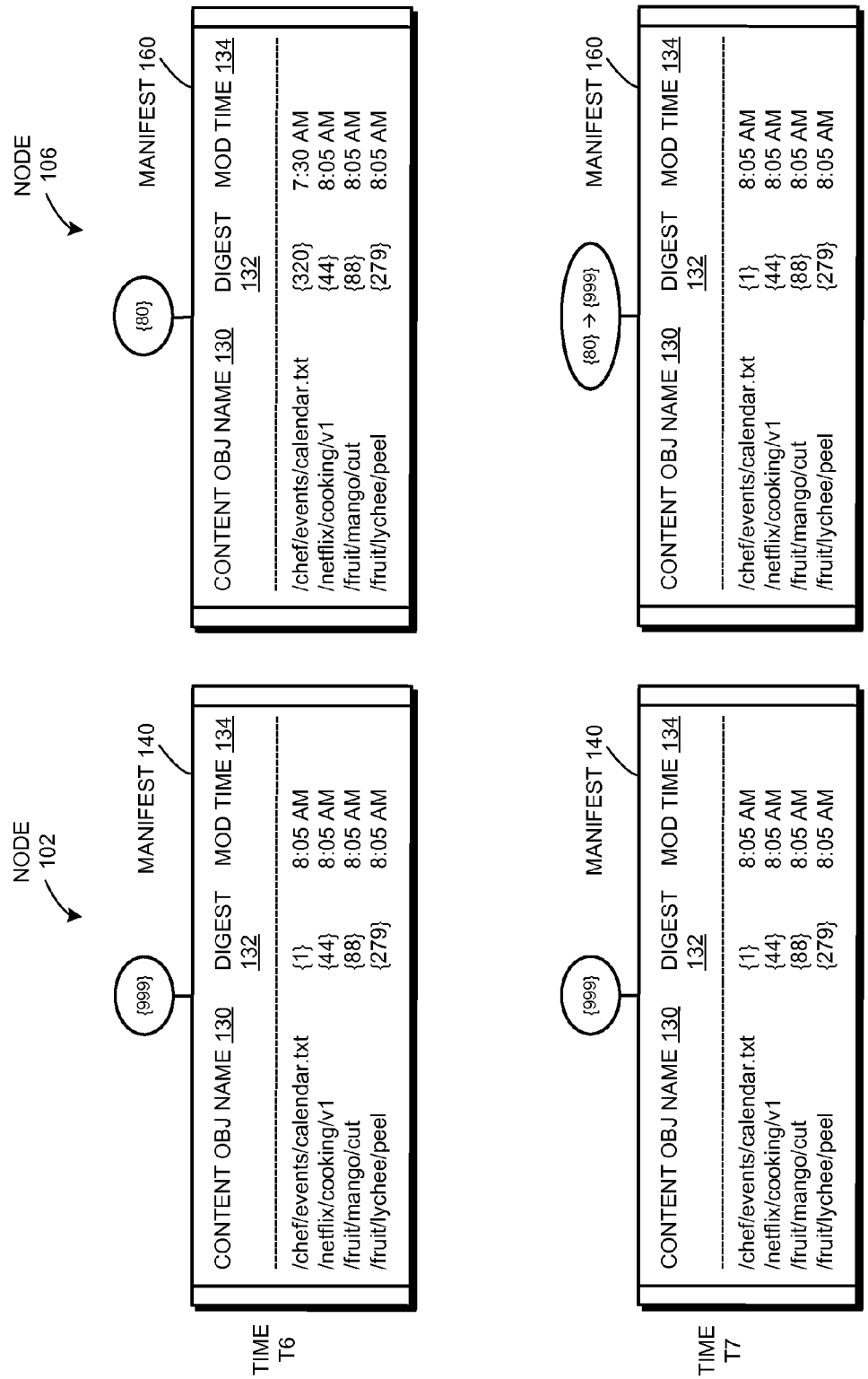
FIG. 6E presents tables depicting the format of two manifests during synchronization, when the digest and modified time of a same named content object in the local manifest is different from the digest in the remote manifest, in accordance with an embodiment of the present invention.

FIG. 6E presents tables depicting the format of two manifests during synchronization, when the digest and modified time of a same named content object in the local manifest is different from the digest in the remote manifest, in accordance with an embodiment of the present invention. At time T6, local node 106 receives a hash advertisement from remote node 102 of manifest 140, with a root hash of {999}. Local node 106 determines that its manifest 160 represents the same collection of data as remote manifest 140 and retrieves manifest 140. Local node 106 determines that local manifest 160, with a root hash of {80}, is not synchronized with remote manifest 140, which has a root hash of {999}. Local node 106 then determines the set difference between its local manifest 160 and remote manifest 140. In this example, both manifest 140 and manifest 160 indicate a modified time 134 corresponding to each content object represented in its collection. The system determines that a content object with the same name in manifest 140 and manifest 160 has a different digest and a different modified time.

It should be noted that a modified time can include information relating to the second, minute, hour, day, month, and year that a corresponding content object was modified. For simplicity, the exemplary manifests in FIG. 6E contain only a time of day. Manifest 140 contains a content object identified by a name of "/chef/events/calendar.txt" with a digest of {1} and a modified time of 8:05 am. Manifest 160 contains a content object identified by the same name with a different digest of {320} and a different modified time of 7:30 am. Local node 106 then sends an interest to remote node 102 for the content object based on the name and digest of the different content object. Remote node 102 returns the requested content object.

Local node 106 determines that the content object from remote manifest 140 with a modified time of 8:05 am is more recent than the content object from its local manifest 160 with a modified time of 7:30 am. So, at time T7, local node 106 updates its manifest 160 with the different and more recent content object. Based on the contents of manifest 160 at time T7, the system generates a new root hash for manifest 160. This is depicted by the root hash value of manifest 160 at time T7: {80}#{999}. Thus, at time T7, manifest 160 at local node 106 is in sync with manifest 140 at remote node 102. Nodes 102 and 106 have synchronized their collections and both contain the same root hash value of {999}.

In some embodiments, the system will retain the previous version of the changed content object (e.g., the content object identified by name "/chef/events/calendar.txt" with a digest of {320} and a modified time of 7:30 am) in a history field of manifest 160. In other embodiments, when remote node 102 receives a hash advertisement from local node 106 of manifest 160 with a root hash of {80} and downloads the local manifest 160, remote node 102 determines that the version of the received content object identified by name "/chef/events/calendar.txt" with a digest of {320} and a modified time of 7:30 am is less recent than the version in its own manifest. In this case, manifest 140 at remote node 102 remains out of sync with manifest 160 at local node 106. The manifests will undergo synchronization at a later time when local node 106 receives a hash advertisement from remote node 102 of manifest 140, which contains the more recently updated content object, as described above.

Secure Synchronization of Manifest Using a Hash Chain

Figure 7A:
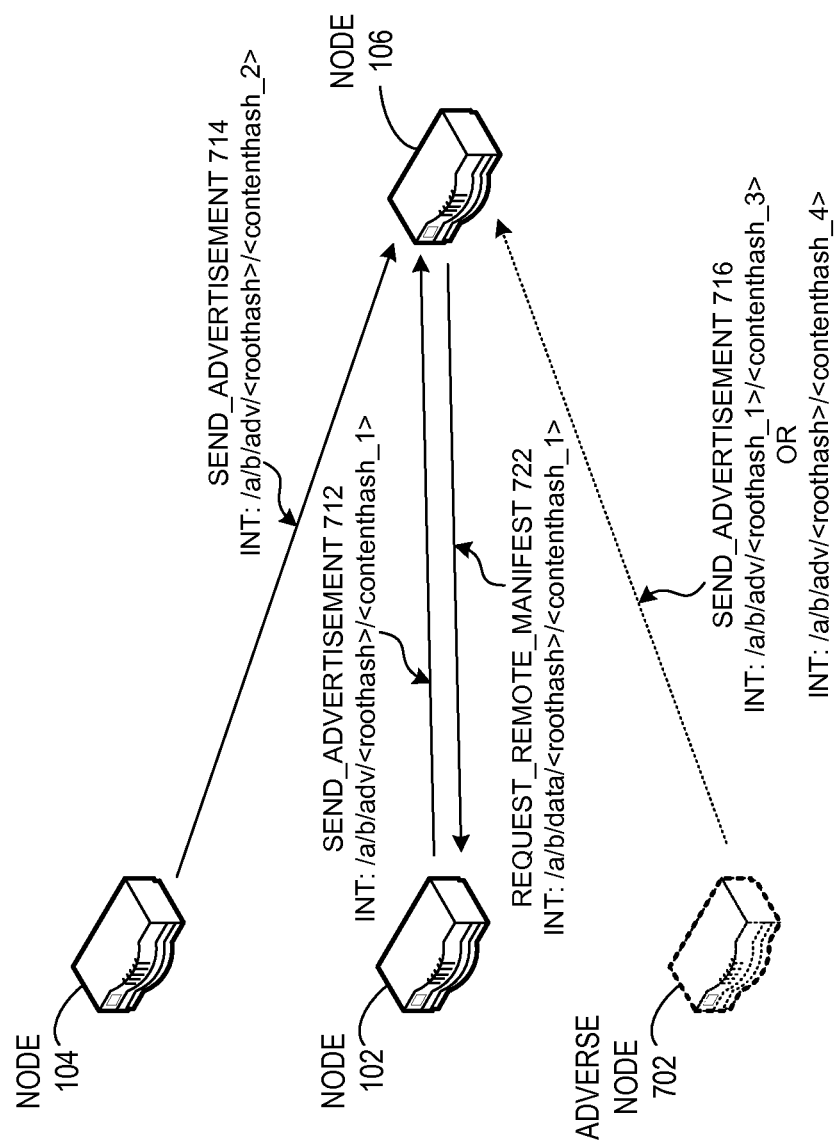
FIG. 7A illustrates an exemplary secure synchronization of manifests, in accordance with an embodiment of the present invention.

In the embodiments of the present invention, in addition to the three-part name comprising a routable prefix, identification of the relevant namespace, and a root hash value of the manifest, an interest of advertisement for a manifest also carries a hash of a content object. FIG. 7A illustrates an exemplary secure synchronization of manifests, in accordance with an embodiment of the present invention. During operation, node 102 transmits a send_advertisement interest 712 (i.e., an interest of advertisement), which is a hash advertisement containing the root hash value of its manifest identified by collection name "/a/b." In addition, interest 712 further comprises a first content hash (denoted as contenthash_1). The first content hash is the cryptographic hash of the first segment (i.e., segment 0) of the manifest, as described in conjunction with FIG. 2. A cryptographic hash is a hash generated based on the cryptographic identity (e.g., a key) of a node. This allows network 100 to disambiguate all potential segment 0's of the manifest to the one given by the content object hash.

If another node 104 also includes the manifest, the first content hash of node 104 (denoted as contenthash_2) can be different than contenthash_1. Node 104 also transmits a send_advertisement interest 714. Upon receiving interests 712 and 714, node 106 can determine from which node the manifest should be obtained. In some embodiments, nodes 102 and 104 use a distributed election to pick one hash chain for both nodes 102 and 104 to use. This leads to reduction of the multiplicity of hashes used to describe one manifest. In some embodiments, the hash chain with the largest hash value is elected. Suppose that contenthash_1 has a higher value than contenthash_2. As a result, node 104 retrieves the first segment of the manifest from node 102 by sending an interest of data in response to interest 712 and obtains the first content hash of the corresponding hash chain.

If node 102 is a valid publisher (i.e., a valid publisher node), node 104 obtains the entire hash chain of node 102 and begins advertising the hash value of node 102. However, the node with the larger content hash value may not be a trusted publisher. For example, adverse node 702 can also transmit a malicious send_advertisement interest 716 (denoted with a dotted line) with the largest hash value. If the key of node 702 is not trusted, node 104 can discard such an interest of advertisement and continue advertising the hash of node 104. Node 106, seeing multiple interests (e.g., interests 712, 714, and 716) for a manifest, can select the largest content object hash of node 702 first. However, because the corresponding hash chain is not from a trusted publisher, node 106 tries another interest of advertisement based on a selection policy. Examples of the selection policy include, but are not limited to, the order of content hash values and a random order to avoid a front-loading attack. Suppose that contenthash_1 has the highest hash value. Node 106 then sends a request_remote_manifest interest 722 comprising contenthash_1.

If adverse node 702 fabricates the root hash (denoted as roothash_1), node 702 can flood the network with one or more fabricated content object hashes (e.g., contenthash_3). Node 106 retrieves the first segment of the fabricated advertisement to look at a key identifier and determines whether node 702 is a trusted participant. Because the key identifier of node 702 is fabricated, node 106 does not trust interest of advertisement 716. On the other hand, if adverse node 702 uses a true root hash but fabricates the content object hash, node 106 retrieves the first segment corresponding to a respective interest of advertisement (e.g., interests 712, 714, and 716) to look at the corresponding key identifier and determines whether the node is an acceptable participant. Node 106 can stop this iteration after the first acceptable advertisement and follow its hash chain. Because a node must follow a hash chain, pipelining the download is limited by the fan-out of the hash chain.

Figure 7B:
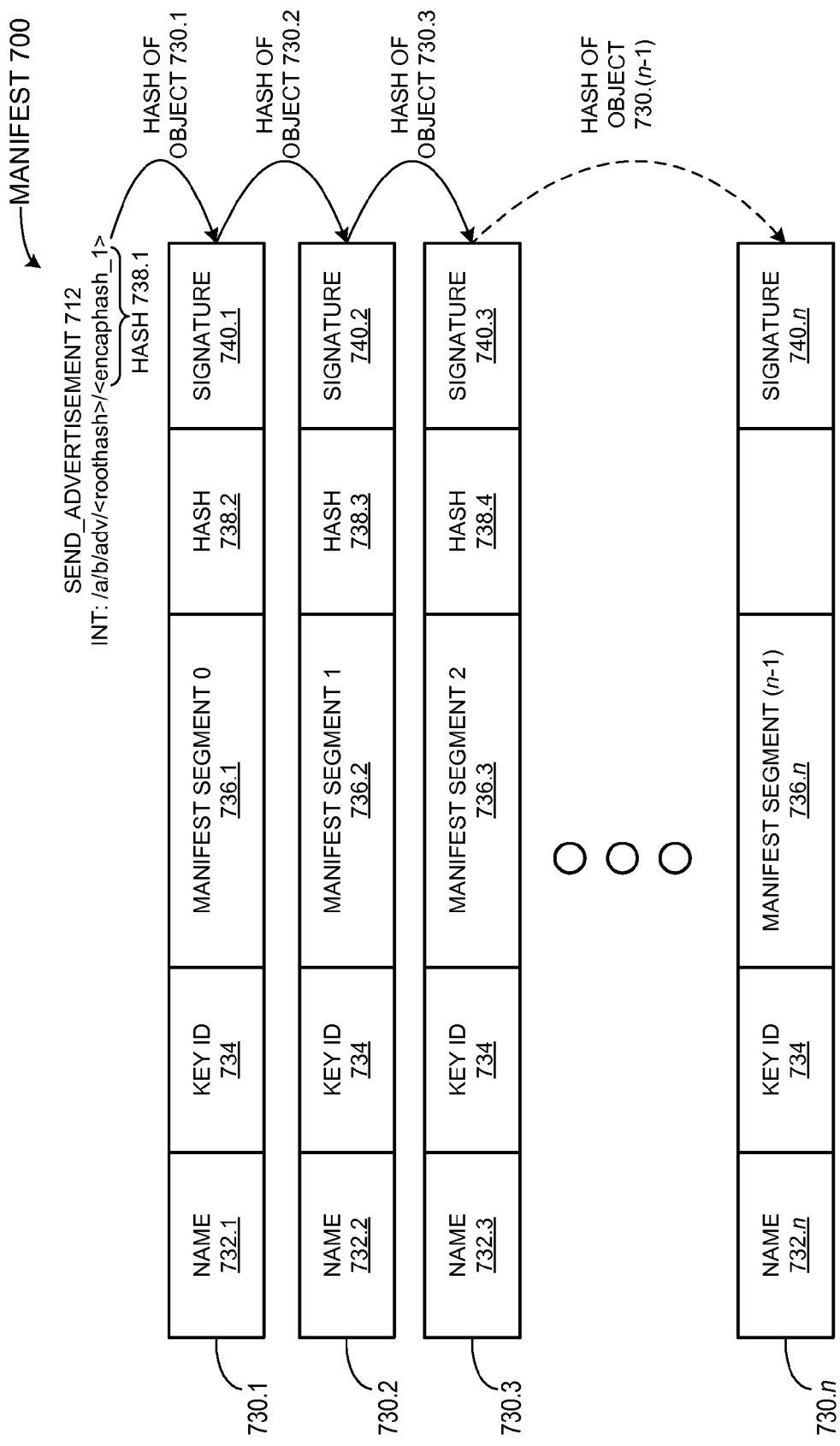
FIG. 7B illustrates an exemplary hash chain for secure synchronization of manifests, in accordance with an embodiment of the present invention.

FIG. 7B illustrates an exemplary hash chain for secure synchronization of manifests, in accordance with an embodiment of the present invention. Suppose that a manifest 700 is segmented into n segments 736.1-736.$n$ (i.e., manifest segments 0 to (n−1)). A respective manifest segment is in a respective content objects 730.1-730.$n$, which are represented by names 732.1-732.$n$, respectively. A name includes a prefix, an identification of the relevant namespace, a root hash of manifest 700, and a content object hash (i.e., the hash of the corresponding content object). For example, name 732.1 includes the root hash of manifest 700 and the hash of content object 730.1. This allows the network to disambiguate all potential segment 0's of manifest 700 to the one given by the content object hash. Inside each content object of manifest 700 is the hash of the next manifest segment. This allows secure chaining of manifest segments from an interest of advertisement corresponding to segment 0.

In this example, the content object representation of manifest 700 results in n objects. Working backwards from the final object, the content object hash of the next object is inserted into the previous object in a distinguished field. It should be noted that the last content object of the manifest may not have a hash of the next content object and the corresponding field can be empty. The hashes for content objects 730.1-730.$n$ are 738.1-738.$n$, respectively (it should be noted that 738.$n$ is not shown on FIG. 7B). In some embodiments, a respective hash is generated using key identifier 734 associated with a node hosting the manifest. This key identifier 734 can be included in a respective content object. The hash of content object 730.4 (not shown on FIG. 7B) is 738.4 and is included in the previous content object 730.3. Similarly, the hash for content object 730.3 is 738.3 and is included in the previous content object 730.2. In this way, the first content object 730.1 includes the hash 738.2 of the next content object 730.2.

In some embodiments, a respective content object in manifest 700 includes a signature of the content object. For example, content objects 730.1, 730.2, 730.3, . . . , 730.$n$ include signatures 740.1, 740.2, 740.3, . . . , 740.$n$, respectively. A signature corresponds to a signature of the rest of the elements in the corresponding content object. For example, signature 740.1 is a signature of {name 730.1, key identifier 734, manifest segment 0, hash 738.2}.

Once the first content object 730.1 is generated, the first hash 738.1 of the hash chain is generated. The first content object hash of 738.1 covers the content object and the hash chain pointer. Therefore, the interest of advertisement for secure synchronization is represented by a name comprising the collection name, an identification of the relevant namespace (e.g., "adv"), a root hash of manifest 700, and content object hash 738.1. If a respective node has a different key identifier, each node produces a unique hash chain, even for the same manifest 700. As a result, the interest of advertisement based on key identifier 734 is unique and interest aggregation at the forwarder is avoided. However, if a node already knows the hash of manifest 700, that node does not need to retrieve each instance of manifest 700, so long as the node has at least one instance from a trusted source.

Operations of Secure Synchronization of Manifest Using a Hash Chain

Figure 8A:
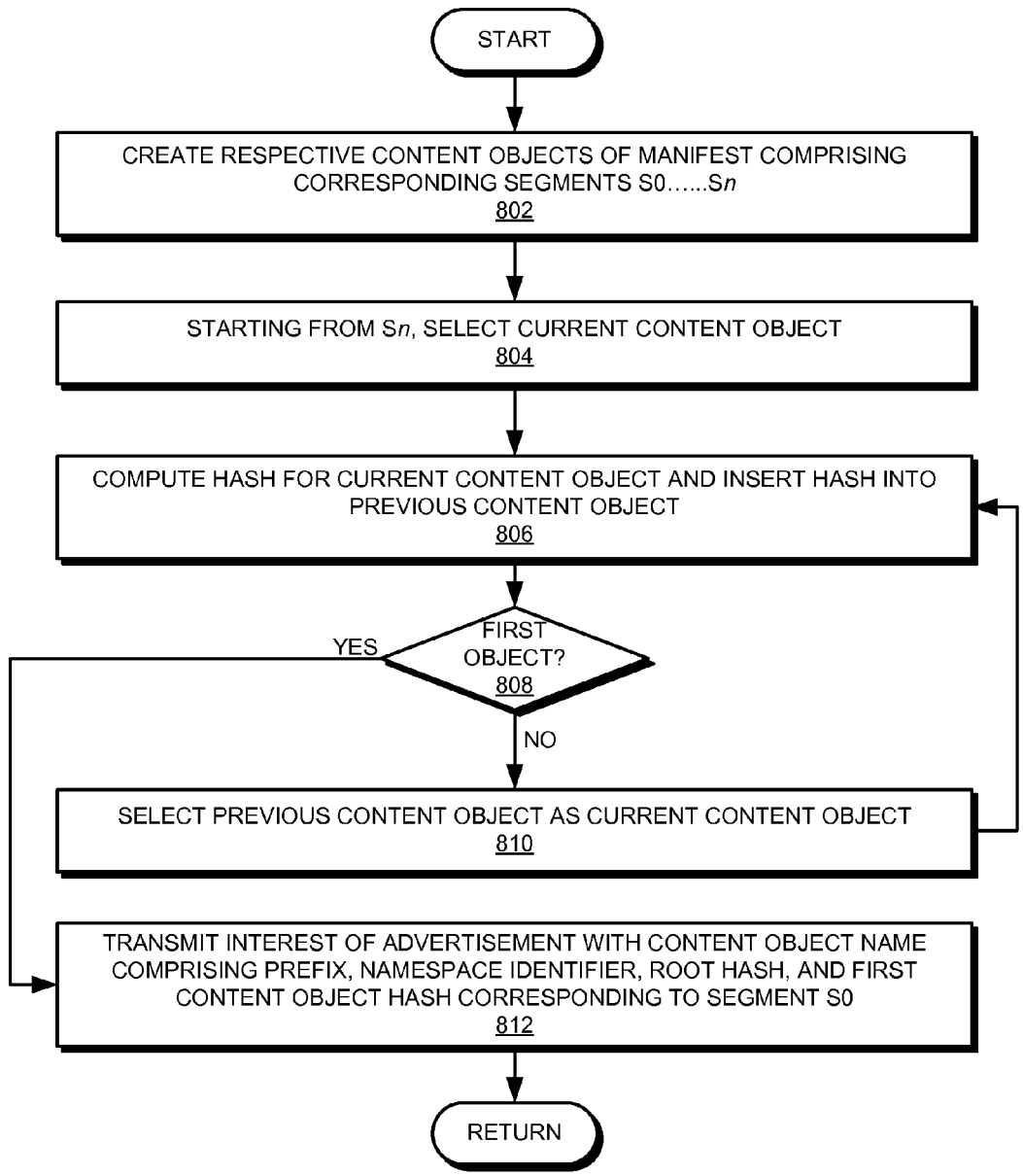
FIG. 8A presents a flowchart illustrating the process of a node securely synchronizing a local manifest using a hash chain, in accordance with an embodiment of the present invention.

FIG. 8A presents a flowchart illustrating the process of a node securely synchronizing a local manifest using a hash chain, in accordance with an embodiment of the present invention. During operation, the node creates respective content objects of a manifest comprising corresponding segments S0-Sn (operation 802). Starting from Sn, the node selects the current content object (operation 804), computes a hash for the current content object and inserts the hash into the previous content object (operation 806). The node then checks whether the current object is the first content object (operation 808). If not, the node selects the previous content object as the current content object (operation 810) and continues to compute the hash for the current content object and insert the hash into the previous content object (operation 806). If the current content object is the first content object, the node transmits an interest of advertisement with the content object name comprising a prefix (or collection name), a namespace identification (e.g., "adv" or "data"), the root hash of the manifest, and the first content object hash corresponding to segment S0 (operation 812).

Figure 8B:
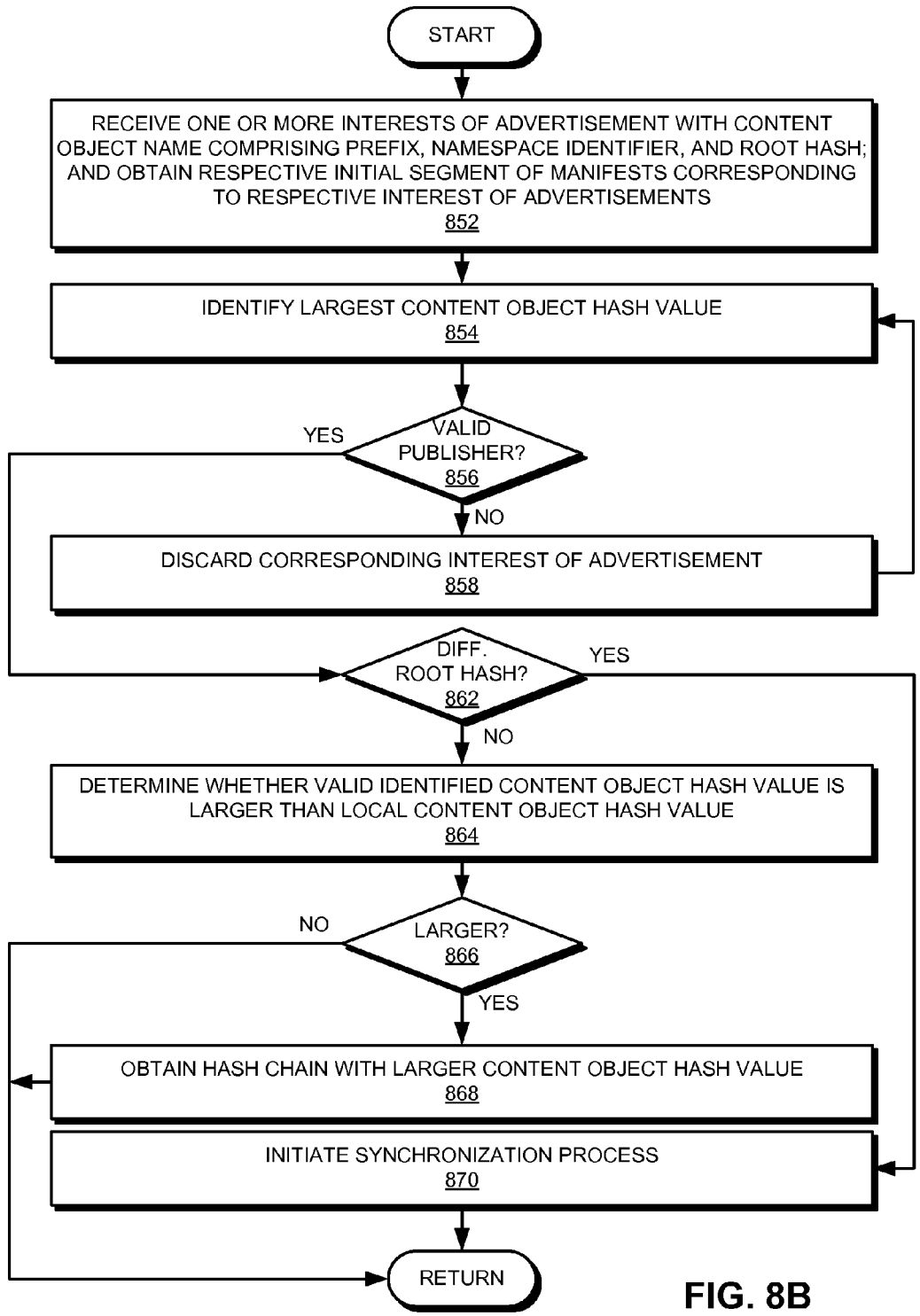
FIG. 8B presents a flowchart illustrating the process of a node initiating a secure synchronization of a remote manifest using a hash chain, in accordance with an embodiment of the present invention.

FIG. 8B presents a flowchart illustrating the process of a node initiating a secure synchronization of a remote manifest using a hash chain, in accordance with an embodiment of the present invention. During operation, the node receives one or more interests of advertisement with content object name comprising a prefix, a namespace identification, and the root hash of the manifest; and obtain respective initial segment of manifests corresponding to the respective interest of advertisements (operation 852). In the example n FIG. 7B, upon receiving advertisement 712, the node obtains segment 0 of manifest 700 (i.e., content object 730.1). It should be noted that the node includes a manifest and may require synchronization, as described in conjunction with FIG. 2. The node identifies the largest content object hash value (operation 854) and checks whether the manifest is from a valid (or trusted) publisher (operation 856). In the example in FIG. 7B, key identifier 734 is used for checking the valid publisher. If not, the node discards the corresponding manifest (operation 858) and continues to identify the next largest content object hash value (operation 854).

If the interest is from a valid publisher, the node checks whether the root hash is different than the local root hash (operation 862). If the root hash is different, the node initiates the synchronization process (operation 870), as described in conjunction with FIG. 3. Otherwise, the node determines whether the valid identified content object hash value is larger than the local content object hash value (operation 864). If the valid identified content object hash value is larger than the local content object hash value (operation 866), the node obtains the hash chain with the larger content object hash value (operation 868).

Figure 8C:
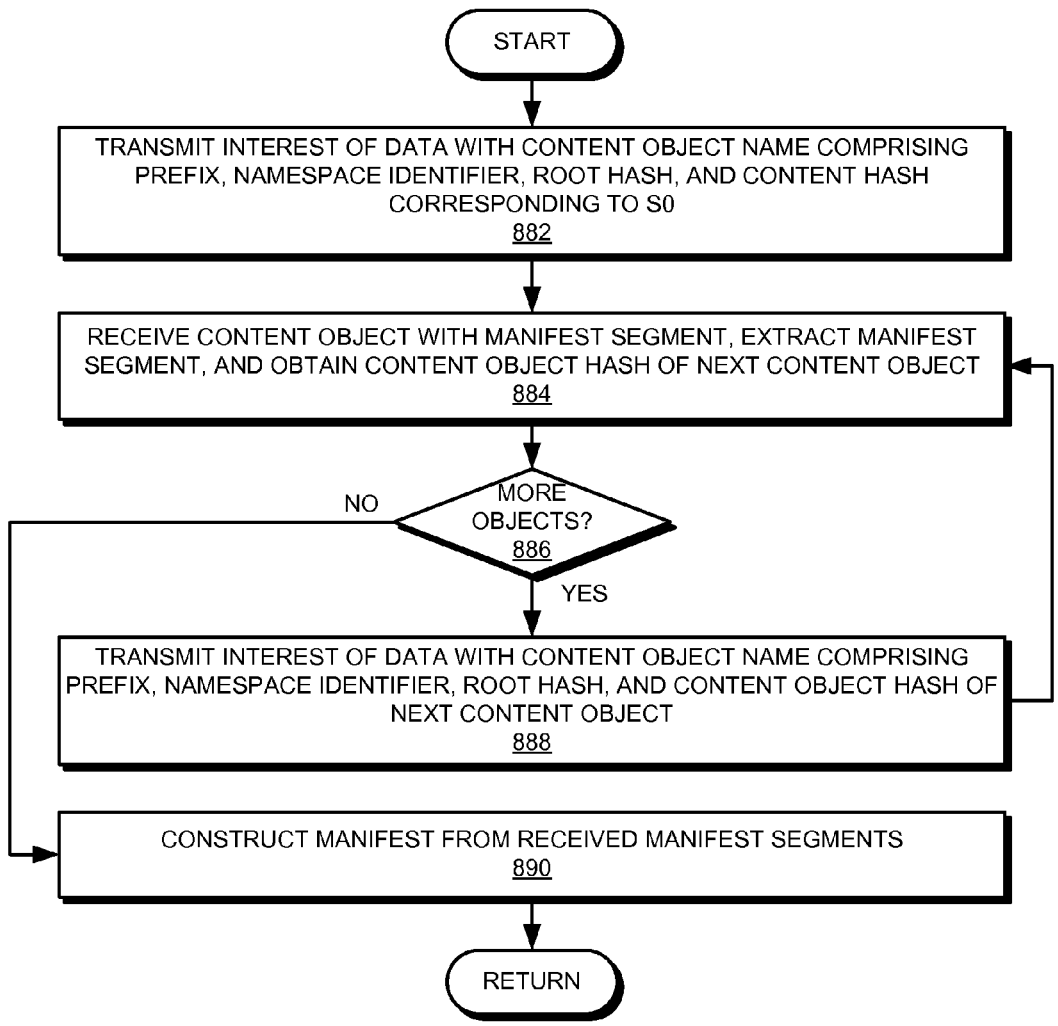
FIG. 8C presents a flowchart illustrating the process of a node securely synchronizing a remote manifest using a hash chain, in accordance with an embodiment of the present invention.

FIG. 8C presents a flowchart illustrating the process of a node securely synchronizing a remote manifest using a hash chain, in accordance with an embodiment of the present invention. During operation, the node transmits an interest of data with content object name comprising a prefix, the corresponding namespace identification (e.g., "data"), the root hash, and the content hash corresponding to S0 (operation 882). The node receives the content object with manifest segment, extracts the manifest segment, and obtains the content object hash of the next content object (operation 884). The node then checks for more content objects (operation 886). If there are more content objects, the node transmits an interest of data with content object name comprising the prefix, the namespace identification, the root hash, and the content object hash of the next content object (operation 888). Otherwise, the node constructs the manifest from received manifest segments (operation 890).

Secure Synchronization of Manifest Using Secure Catalog

In the embodiments of the present invention, in addition to the three-part name comprising a routable prefix, identification of the relevant namespace, and a root hash value of the manifest, an interest of advertisement for a manifest also carries a hash of a content object. This content object can correspond to a secure catalog comprising hash values of the respective content objects of the manifest. Rather than advertising the content object hash of the first segment of the manifest, a node may advertise the name of a secure catalog that enumerates all segments of the manifest. In some embodiments, the secure catalog can also be segmented. This can allow a faster performance by pipelining a download because a device may retrieve a plurality of segments of the catalog after one round trip.

This embodiment has a further benefit. Because it uses a secure catalog for the signature, the individual content objects that comprise the manifest are not publisher specific. Therefore, the hash values of the content objects do not depend on which has node generated the catalog, thereby improving the caching and reusing.

Figure 9A:
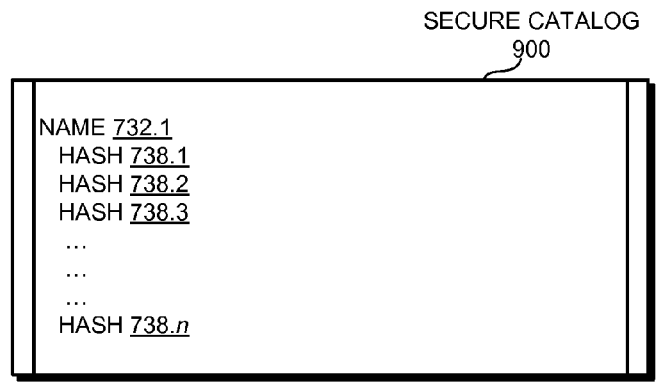
FIG. 9A illustrates an exemplary secure catalog for secure synchronization of manifests, in accordance with an embodiment of the present invention.

FIG. 9A illustrates an exemplary secure catalog for secure synchronization of manifests, in accordance with an embodiment of the present invention. In this example, a secure catalog 900 for manifest 700 includes name 732.1 of the first content object 730.1 of manifest 700. Catalog 900 also lists content object hashes 738.1-738.$n$ of manifest 700. In some embodiments, content objects of manifest 700 are unsigned and can be identical for every publisher with the same manifest 700. The only difference is the signature of secure catalog 900. If secure catalog 900 of manifest 700 is too large for a single content object, the subsequent objects after the first content object can be unsigned and identical among publishers. Only the first segment of the secure catalog can contain publisher-specific information, such as a signature and timestamps, and use a secure method, such as hash chains, to later segments of the catalog.

In this example, a system breaks manifest 700 into n content objects 730.1-730.$n$, with hashes 738.1-738.$n$, respectively. In some embodiments, content objects 730.1-730.$n$ do not include publisher-specific data and are unsigned. The system creates a secure catalog 900 with entries comprising hashes 738.1-738.$n$. Catalog 900 can be signed. The content object of catalog 900 can have a hash <cataloghash>. The resulting interest of advertisement has a name of the form "/a/b/adv/<roothash>/<cataloghash>." Secure catalogs from multiple publishers for the same manifest may use a distributed election to converge on one secure catalog. Examples of a distributed election include, but are not limited to, the largest and the smallest hash value. One advantage of secure synchronization using secure catalog is that the content objects of the catalog can be identical among all publishers. As a result, the distributed election is only for using the secure catalog name. In some embodiments, the contents of the catalog can be identical among all publishers for the same manifest hash.

Figure 9B:
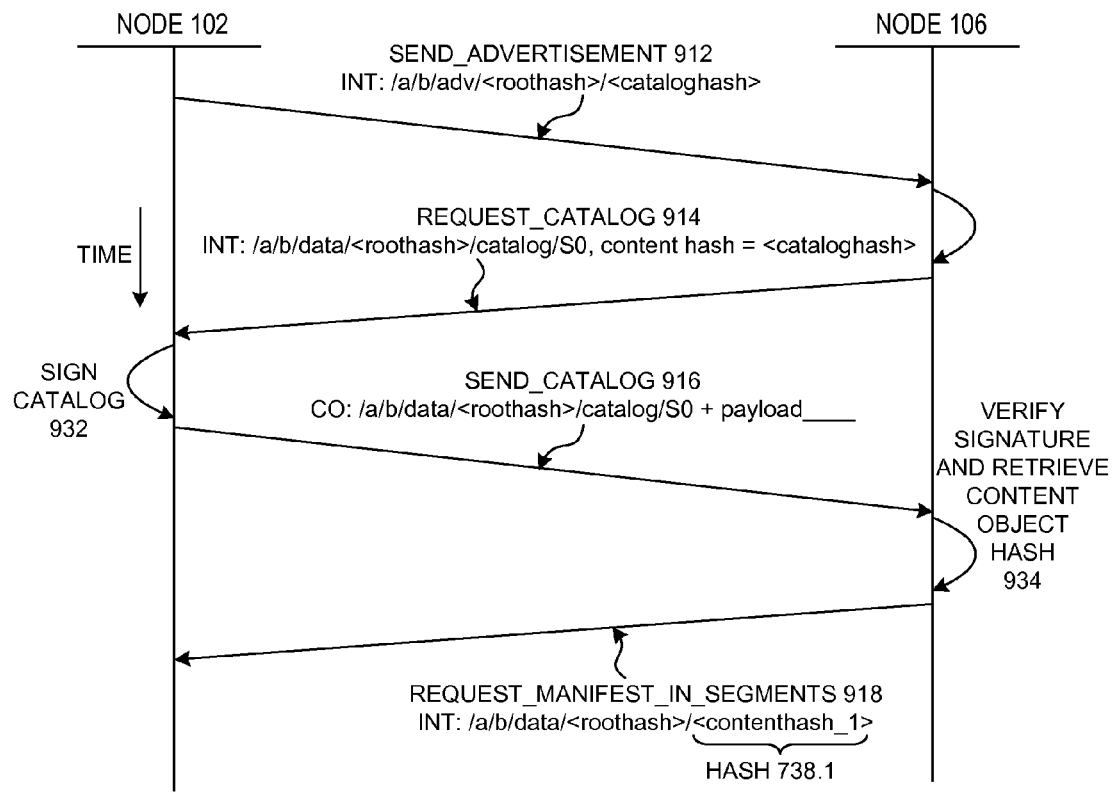
FIG. 9B illustrates an exemplary secure synchronization of manifests using a secure catalog, in accordance with an embodiment of the present invention.

FIG. 9B illustrates an exemplary secure synchronization of manifests using a secure catalog, in accordance with an embodiment of the present invention. During operation, node 102 transmits a send_advertisement interest 912 (i.e., an interest of advertisement), which is a hash advertisement containing the root hash value of its manifest identified by collection name "/a/b" and the hash of a corresponding secure catalog (e.g., catalog 900) <cataloghash>. The interest takes the form of: "/a/b/advkroothash>/<cataloghash>." This secure catalog includes respective content object hashes of the segments of the manifest. Node 106 receives the interest and sends a request_catalog interest 914 (i.e., an interest of data) comprising an interest of the first segment of the catalog. Interest 914 can take the form: "/a/b/datakroothash>/catalog/S0, content hash=<cataloghash>." In other words, when the node requests the data with a content object hash, that hash value is in a distinct field of interest 914 and may not be incorporated in the name.

In some embodiments, upon receiving the interest of data, node 102 signs the catalog (procedure 932) and sends a send_catalog message 916 comprising the corresponding content object (CO). This message 916 includes the first segment S0 of the catalog and takes the form: "/a/b/datakroothash>/catalog/S0+payload," wherein the payload contains the requested segment of the catalog. The hash of the content object in message 916 is <cataloghash> (i.e., hash(CO)=<cataloghash>). Upon receiving the catalog, node 106 verifies the signature of node 102 to ensure that node 102 is the valid publisher of the catalog and retrieves the respective content object hash (procedure 934). Node 106 then sends a set of interests for the segments of the manifest. The set of interests is segmented based on a segmentation protocol. The interests are sent in a request_manifest_in_segments message 918 (i.e., an interest of data), and are of the form: "/a/b/data/<roothash>/<contenthash_1>", "/a/b/data/<roothash>/contenthash_2," "/a/b/data/<roothash>/contenthash_3," etc. In the example FIG. 9A, <contenthash_1>, <contenthash_2>, and <contenthash_3> correspond to hashes 738.1, 738.2, and 738.3, respectively.

Operations of Secure Synchronization of Manifest Using Secure Catalog

Figure 10A:
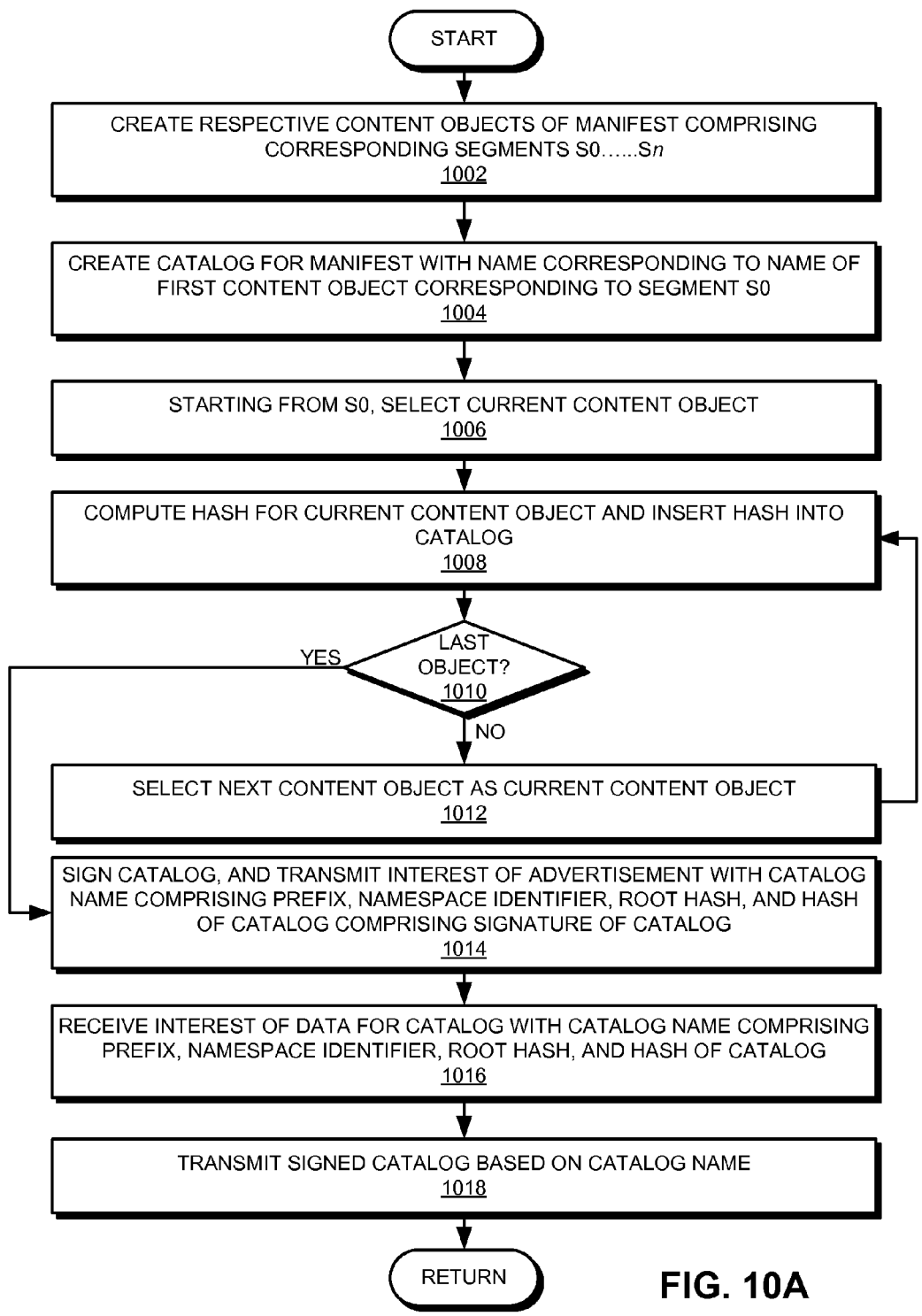
FIG. 10A presents a flowchart illustrating the process of a node securely synchronizing a local manifest using a secure catalog, in accordance with an embodiment of the present invention.

FIG. 10A presents a flowchart illustrating the process of a node securely synchronizing a local manifest using a secure catalog, in accordance with an embodiment of the present invention. During operation, the node creates respective content objects of a manifest comprising corresponding segments S0-Sn (operation 1002). The node creates a catalog for the manifest with a name corresponding to the name of the first content object corresponding to segment S0 (operation 1004). Starting from S0, the node selects the current content object (operation 1006), and computes a hash for the current content object and inserts the hash into the catalog (operation 1008). The node then checks whether the current object is the last content object (operation 1010). If not, the node selects the next content object as the current content object (operation 1012) and continues to compute the hash for the current content object and insert the hash into the catalog (operation 1008).

If the current content object is the last content object, the node signs the catalog, and transmits an interest of advertisement with the catalog name comprising a prefix (or collection name), a namespace identification (e.g., "adv"), the root hash of the manifest, and the hash of the catalog comprising the signature of the catalog (i.e., the signature of the catalog is a part of the hash of the catalog) (operation 1014). The node receives an interest of data with the catalog name comprising the prefix, the namespace identification (e.g., "data"), the root hash of the manifest, and the hash of the catalog (operation 1016). The node transmits the signed catalog based on the catalog name (operation 1018), as described in conjunction with FIG. 9B.

Figure 10B:
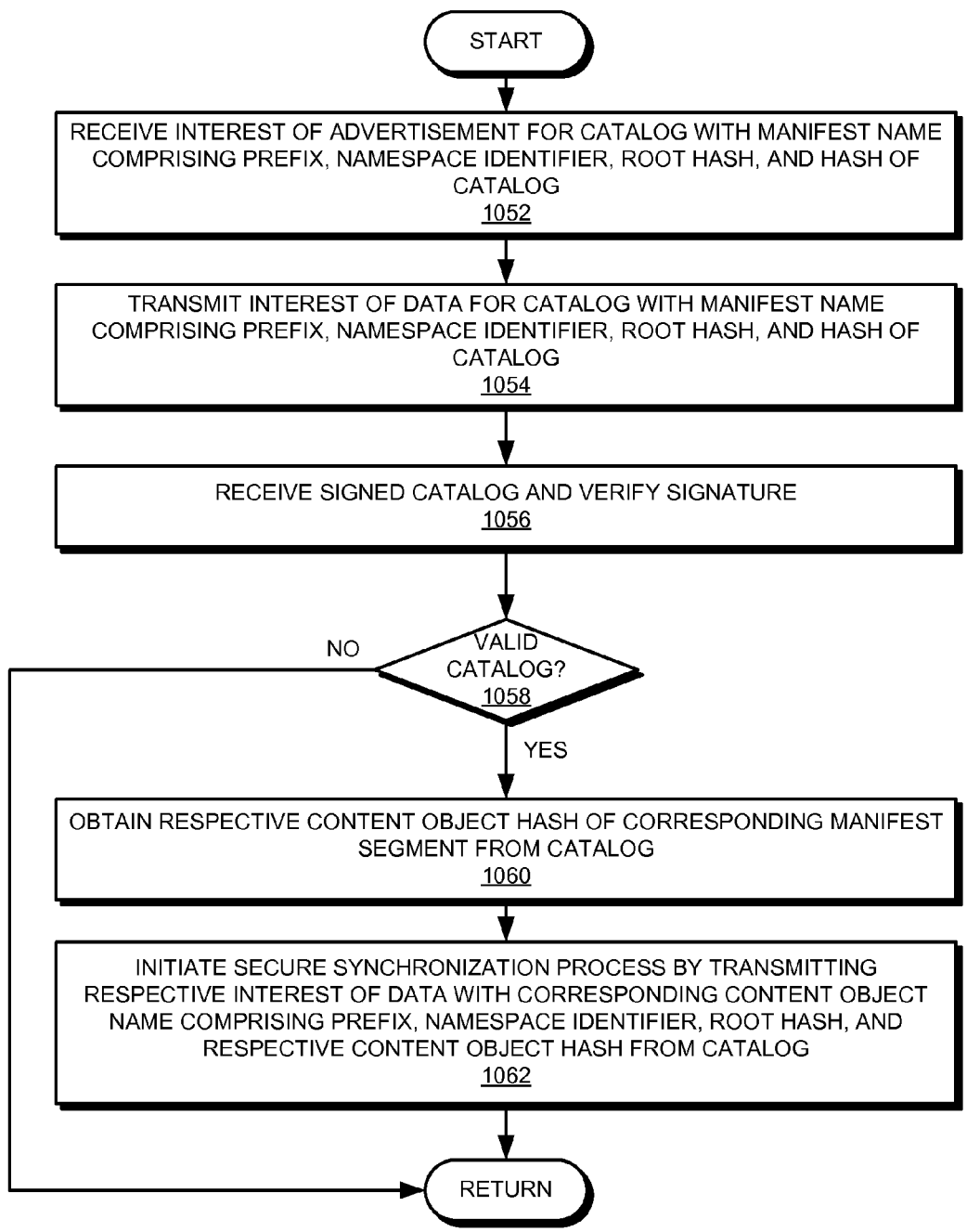
FIG. 10B presents a flowchart illustrating the process of a node securely synchronizing a remote manifest using a secure catalog, in accordance with an embodiment of the present invention.

FIG. 10B presents a flowchart illustrating the process of a node securely synchronizing a remote manifest using a secure catalog, in accordance with an embodiment of the present invention. During operation, the node receives an interest of advertisement with the catalog name comprising a prefix (or collection name), a namespace identification (e.g., "adv"), the root hash of the manifest, and the hash of the catalog (operation 1052). It should be noted that the node includes a manifest and may require synchronization, as described in conjunction with FIG. 2. The node transmits an interest of data with the catalog name comprising the prefix, the namespace identification (e.g., "data"), the root hash of the manifest, and the hash of the catalog (operation 1054). The node receives a signed catalog and verifies the signature (operation 1056).

The node then checks whether the catalog is a valid catalog (operation 1058) based on the signature verification. If the catalog is valid, the node obtains a respective content object hash of a corresponding manifest segment from the catalog (operation 1060). The node then initiates the secure synchronization process by transmitting a respective interest of data with a corresponding content object name comprising the prefix, the namespace identification, the root hash, and the respective content object hash from the catalog (operation 1062).

Computer System

Figure 11:
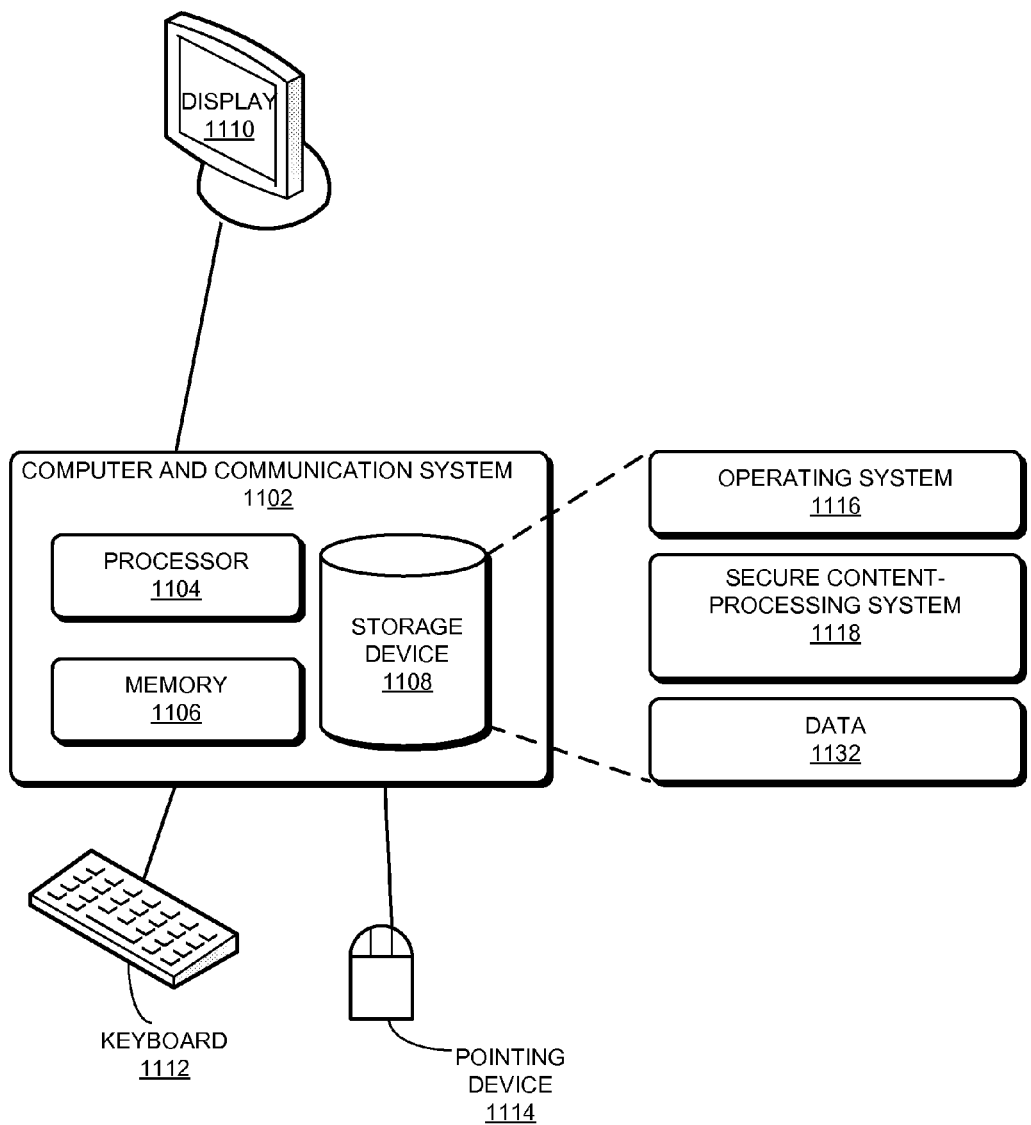
FIG. 11 illustrates an exemplary computer and communication system that facilitates secure synchronization of manifests in a CCN, in accordance with an embodiment of the present invention.

FIG. 11 illustrates an exemplary computer and communication system that facilitates secure synchronization of manifests in a CCN, in accordance with an embodiment of the present invention. Computer and communication system 1102 includes a processor 1104, a memory 1106, and a storage device 1108. Memory 1106 can include a volatile memory (e.g., RAM) that serves as a managed memory, and can be used to store one or more memory pools. Furthermore, computer and communication system 1102 can be coupled to a display device 1110, a keyboard 1112, and a pointing device 1114. Storage device 1108 can store an operating system 1116, a secure content-processing system 1118, and data 1132.

Secure content-processing system 1118 can include instructions, which when executed by computer and communication system 1102, can cause computer and communication system 1102 to perform methods and/or processes described in this disclosure. Specifically, secure content-processing system 1118 can facilitate secure synchronization of manifests in a CCN. In some embodiments, secure content-processing system 1118 can be executed on a plurality of computer and communication systems, which are able to exchange data that describes the state of the operation associated with secure content-processing system 1118.

In summary, embodiments of the present invention provide a computer system and a method that facilitates secure synchronization of manifests in a CCN. During operation, the system generates an interest of advertisement comprising a name of a content object of the system. This name represents a collection of objects of the system and includes a first hash that is based on a key of the system. The first hash corresponds to a respective content object hash of one or more segments of a manifest representing the collection of objects. The system also determines a request for the content object based on the name in an interest of data from a remote node.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
generating, by a computing device, an advertisement of a collection of content objects stored at the computing device, wherein a name included in the advertisement is a hierarchically structured variable length identifier which comprises contiguous name components ordered from a most general level to a most specific level,
wherein a last component of the name for the advertisement is a first hash that is based on a key of the computing device,
wherein the first hash is a hash of one or more segments of a manifest representing the collection of content objects,
wherein a segment of a manifest is distinct from a content object associated with the collection; and
receiving a request for a content object associated with the collection based on a name of a received interest of data from a remote node, wherein the last component of the name of the received interest is the first hash.

2. The method of claim 1, wherein the requested content object is a first segment of the manifest; and
wherein the requested content object comprises a second hash of a second segment of the manifest.

3. The method of claim 2, further comprising electing, based on the advertisement, the manifest at the computing device from a plurality of manifests with a same manifest hash, wherein the plurality of manifests is distributed among a plurality of nodes.

4. The method of claim 1, wherein the requested content object is a secure catalog at the computing device, wherein the secure catalog comprises the respective content object hash of the segments of the manifest, and wherein the first hash is a hash of the secure catalog.

5. The method of claim 4, further comprising signing the secure catalog using the key of the computing device.

6. The method of claim 4, further comprising electing, based on the advertisement, the secure catalog at the computing device from a plurality of secure catalogs with the same content object hash, wherein the plurality of secure catalogs is distributed among a plurality of nodes.

7. The method of claim 4, wherein the secure catalog is distributed among a plurality of segments; and
wherein a content object of a first segment of the secure catalog includes a hash of a content object of a second segment of the secure catalog.

8. The method of claim 4, further comprising generating a message comprising a segment of the manifest in response to an interest of data from a remote node for the segment, wherein the interest of data includes one of the content object hashes in the secure catalog.

9. The method of claim 1, wherein the key of the computing device identifies the computing device as a trusted publisher.

10. A computer-executable method, comprising:
obtaining, by a computing device, a name included in an advertisement from a remote node, wherein the name represents a collection of objects at the remote node and is a hierarchically structured variable length identifier which comprises contiguous name components ordered from a most general level to a most specific level,
wherein a last name component of the name for the advertisement is a first hash that is based on a key of the remote node,
wherein the first hash is a hash of one or more segments of a manifest representing the collection of content objects,
wherein a segment of a manifest is distinct from a content object associated with the collection; and
generating for the remote node an interest of data comprising a request for the collection of content objects based on the name.

11. A non-transitory computer-readable storage medium storing instructions that when executed by a computer cause the computer to perform a method, the method comprising:
generating an advertisement of a collection of content objects stored at a local node, wherein a name included in the advertisement is a hierarchically structured variable length identifier which comprises contiguous name components ordered from a most general level to a most specific level, wherein a last component of the name for the advertisement is a first hash that is based on a key of the local node, wherein the first hash is a hash of one or more segments of a manifest representing the collection of content objects, wherein a segment of a manifest is distinct from a content object associated with the collection; and receiving a request for a first content object associated with the collection based on a name of a received interest of data from a remote node, wherein the last component of the name of the received interest is the first hash.

12. The non-transitory computer-readable storage medium of claim 11, wherein the requested content object is a first segment of the manifest; and wherein the requested content object comprises a second hash of a second segment of the manifest.

13. The non-transitory computer-readable storage medium of claim 11, wherein the method further comprises electing, based on the advertisement, the manifest at the local node from a plurality of manifests with a same manifest hash, wherein the plurality of manifests is distributed among a plurality of nodes.

14. The non-transitory computer-readable storage medium of claim 11, wherein the requested content object is a secure catalog at the local node, wherein the secure catalog comprises the respective content object hash of the segments of the manifest, and wherein the first hash is a hash of the secure catalog.

15. The non-transitory computer-readable storage medium of claim 14, wherein the method further comprises signing the secure catalog using the key of the local node.

16. The non-transitory computer-readable storage medium of claim 14, wherein the method further comprises electing, based on the advertisement, the secure catalog at the local node from a plurality of secure catalogs with the same content object hash, wherein the plurality of secure catalogs is distributed among a plurality of nodes.

17. The non-transitory computer-readable storage medium of claim 14, wherein the secure catalog is distributed among a plurality of segments; and wherein a content object of a first segment of the secure catalog includes a hash of a content object of a second segment of the secure catalog.

18. The non-transitory computer-readable storage medium of claim 14, wherein the method further comprises generating a message comprising a segment of the manifest in response to an interest of data from a remote node for the segment, wherein the interest of data includes one of the content object hashes in the secure catalog.

19. The non-transitory computer-readable storage medium of claim 11, wherein the key of the local node identifies the local node as a trusted publisher.

20. A non-transitory computer-readable storage medium storing instructions that when executed by a computer cause the computer to perform a method, the method comprising:

obtaining a name included in an advertisement from a remote node, wherein the name represents a collection of objects at the remote node and is a hierarchically structured variable length identifier which comprises contiguous name components ordered from a most general level to a most specific level, wherein a last name component of the name for the advertisement is a first hash that is based on a key of the remote node, wherein the first hash is a hash of one or more segments of a manifest representing the collection of content objects, wherein a segment of a manifest is distinct from a content object associated with the collection; and generating for the remote node an interest of data comprising a request for the collection of content objects based on the name.

* * * * *